United States Patent
Matsumoto et al.

(10) Patent No.: US 6,732,021 B2
(45) Date of Patent: May 4, 2004

(54) LANE-KEEP CONTROL SYSTEM FOR VEHICLE

(75) Inventors: Shinji Matsumoto, Yokohama (JP); Satoshi Tange, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 7 days.

(21) Appl. No.: 10/288,363

(22) Filed: Nov. 6, 2002

(65) Prior Publication Data

US 2003/0097206 A1 May 22, 2003

(30) Foreign Application Priority Data

Nov. 20, 2001 (JP) .......................... 2001-355304

(51) Int. Cl.[7] .................................. G08G 1/00
(52) U.S. Cl. .............................. 701/1; 701/307; 342/70; 340/435; 340/438; 340/901; 340/937; 340/988; 180/170
(58) Field of Search .......................... 701/1, 23, 301, 701/41, 37, 96, 208, 207; 342/70, 165; 340/988, 902, 903, 435, 436, 444, 441, 467, 465, 901, 937, 938; 180/170, 782; 382/104, 168; 348/148

(56) References Cited

U.S. PATENT DOCUMENTS

| | | | | |
|---|---|---|---|---|
| 5,890,083 A | * | 3/1999 | Franke et al. ............... | 701/45 |
| 5,942,993 A | * | 8/1999 | Mio et al. ................... | 340/933 |
| 6,057,754 A | * | 5/2000 | Kinoshita et al. ........... | 340/435 |
| 6,317,057 B1 | * | 11/2001 | Lee ............................. | 340/901 |
| 6,317,692 B2 | * | 11/2001 | Kodaka et al. ............. | 701/301 |
| 6,411,901 B1 | * | 6/2002 | Hiwatashi et al. .......... | 701/301 |
| 2001/0018641 A1 | * | 8/2001 | Kodaka et al. ............. | 701/301 |

FOREIGN PATENT DOCUMENTS

| | | | |
|---|---|---|---|
| JP | 406309599 A | * | 11/1994 |
| JP | 7-105499 A | | 4/1995 |
| JP | 408203000 A | * | 8/1996 |
| JP | 11-96497 A | | 4/1999 |
| JP | 2000-33860 A | | 2/2000 |
| JP | 001087360 A2 | * | 3/2001 |

* cited by examiner

Primary Examiner—Thomas G. Black
Assistant Examiner—Tuan C. To
(74) Attorney, Agent, or Firm—Foley & Lardner LLP

(57) ABSTRACT

A lane-keep control system for a host vehicle is arranged to execute a lane-keep control of controlling the host vehicle toward a deviation-preventing direction of preventing the lane deviation according to a vehicle traveling condition when there is a tendency of the lane deviation and to limit the lane-keep control when a determination as to the tendency of the lane deviation is made under a condition that the host vehicle is traveling a lane-deviation area deviated from a traveling lane.

18 Claims, 18 Drawing Sheets

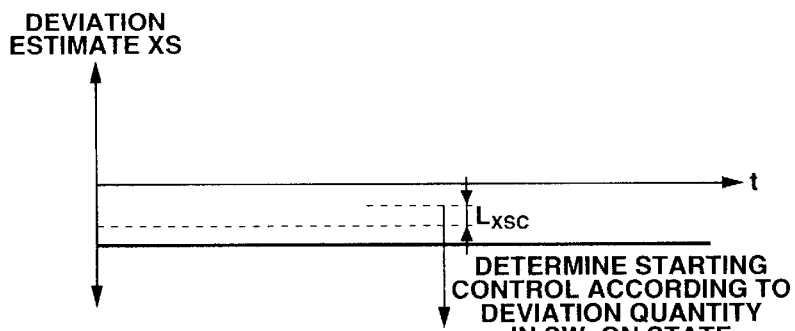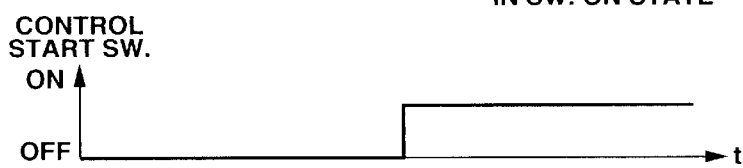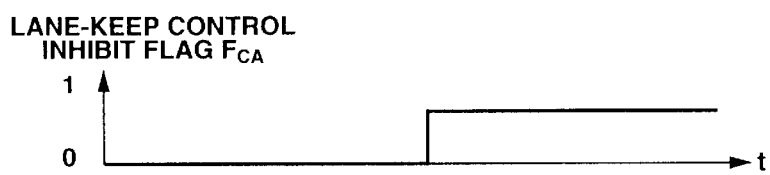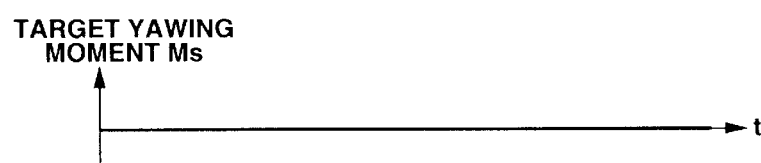

LANE-KEEP CONTROL SYSTEM FOR VEHICLE

BACKGROUND OF THE INVENTION

The present invention relates to a lane-keep control system which controls a host vehicle so as to prevent a deviation of the host vehicle from a traveling lane.

Japanese Patent Provisional Publication No. 7-105499 discloses a lane-keep control system which starts a lane-keep control when a lane-keep control starting condition is satisfied and terminates the lane-keep control after the host vehicle is directed parallel to a traveling lane.

SUMMARY OF THE INVENTION

However, this lane-keep control system simply starts the lane-keep control according to the comparison between parameters and thresholds. Accordingly, when the lane deviation is suddenly detected in an already deviated condition of the host vehicle due to unclearness of lane markers for the traveling lane, the system starts the lane-keep control using a relatively large controlled variable. This lane-keep control using the large controlled variable at a deviated area applies a strange feeling to a driver.

It is therefore an object of the present invention to provide an improved lane-keep control system which executes a lane-keep control according to a deviation state of the host vehicle so as not to apply a strange feeling to a driver.

An aspect of the present invention resides in a lane-keep control system which is for a host vehicle and comprises a control unit. The control unit is configured to detect a traveling condition of the host vehicle, to determine whether there is a tendency of a lane deviation indicative that the host vehicle is deviating from a traveling lane, according to the traveling condition, to execute a lane-keep control for controlling the host vehicle toward a deviation-preventing direction of preventing the lane deviation according to the traveling condition when there is the tendency of the lane deviation, and to limit the lane-keep control when the lane-keep control is executed according to the determination as to the tendency of the lane deviation and when the determination as to the tendency of the lane deviation is made according to the traveling condition under a condition that the host vehicle is traveling a lane-deviation area deviated from the traveling lane.

Another aspect of the present invention resides in a method of executing a lane-keep control for controlling a host vehicle toward a deviation-preventing direction of preventing a lane deviation. The method comprises an operation for detecting a traveling condition of the host vehicle; an operation for determining whether there is a tendency of the lane deviation that the host vehicle is deviating from a traveling lane according to the traveling condition; an operation for executing the lane-keep control according to the traveling condition when there is the tendency of the lane deviation; and an operation for limiting the lane-keep control when the lane-keep control is executed according to the determination as to the tendency of the lane deviation and when the determination as to the tendency of the lane deviation is made according to the traveling condition under a condition that the host vehicle is traveling a lane-deviation area deviated from the traveling lane.

The other objects and features of this invention will become understood from the following description with reference to the accompanying drawings.

BRIEF DESCRIPTION OF THE DRAWINGS

FIGS. 13A through 13E are time charts employed to explain the operation of the second embodiment.

DETAILED DESCRIPTION OF THE INVENTION

With reference to drawings, embodiment of a lane-keep control system according to the present invention will be discussed hereinafter.

Referring to FIGS. 1 through 8, there is shown a first embodiment of a lane-keep control system for a host vehicle according to the present invention.

Figure 1:
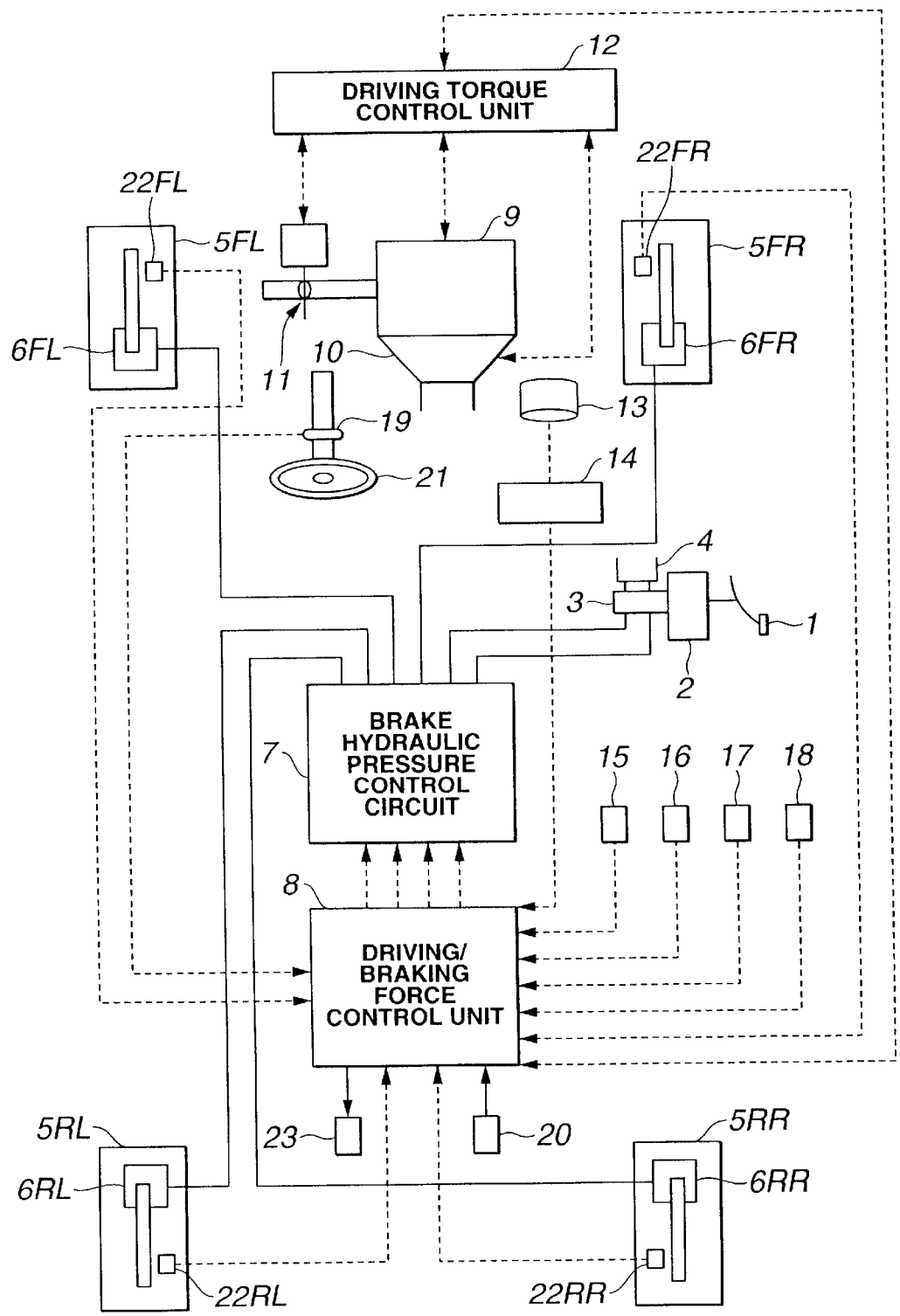
FIG. 1 is a schematic view showing a vehicle equipped with a lane-keep control system according to a first embodiment of the present invention.

As shown in FIG. 1, the host vehicle is a rear-drive vehicle equipped with an automatic transmission and a conventional differential gear. The host vehicle equipped with the lane-keep control system comprises a brake system which is capable of independently controlling a braking force of each of front-left, front-right, rear-left and rear-right wheels 5FL, 5FR, 5RL and 5RR. The brake system comprises a brake pedal 1, a booster 2, a master cylinder 3 and a reservoir 4. Normally, each of wheel cylinders 6FL, 6FR, 6RL and 6RR of the respective wheels 5FL, 5FR, 5RL and 5RR receives brake hydraulic pressure pressurized by master cylinder according to a depression degree of brake pedal 1 depressed by a driver. Further, a brake hydraulic pressure control circuit 7 is provided between master cylinder 3 and each of wheel cylinders 6FL, 6FR, 6RL, and 6RR so as to be capable of independently controlling the hydraulic pressure of each of wheel cylinders 6FL, 6FR, 6RL and 6RR.

Brake hydraulic pressure control circuit 7 is common with a brake hydraulic pressure control circuit employed in an antiskid control system and/or a traction control system. In this embodiment, the brake system is arranged so as to independently increase and decrease brake hydraulic pressure of each of wheel cylinders 6FL, 6FR, 6RL and 6RR. Brake hydraulic pressure control circuit 7 controls the brake hydraulic pressure of each of wheel cylinders 6FL, 6FR, 6RL and 6RR according to a command brake hydraulic pressure outputted from driving/braking force control unit 8.

The host vehicle is equipped with a driving torque control unit 12 which controls a driving torque applied to rear wheels 5RL and 5RR by controlling an operating condition of engine 9, a selected transmission ratio of an automatic transmission 10 and a throttle opening of a throttle valve 11. The control of the operating condition of engine 9 is executed by controlling a fuel injection quantity and ignition timing. Further, the control of the fuel injection quantity and the ignition timing may be simultaneously executed with the throttle opening control to control the operating condition of engine 9.

Driving torque control unit 12 is capable of independently controlling the driving torque of rear wheels 5RL and 5RR acting as driving wheels. Further, when driving torque control unit 12 receives a command driving torque from driving/braking force control unit 8, driving torque control unit 12 controls the driving torque with reference to the command driving torque.

The host vehicle is further equipped with a CCD camera 13 and a camera controller 14 which function as an external sensing unit for detecting a position of the host vehicle relative to a traveling lane, in order to determine whether the host vehicle is deviating from a traveling lane, in other words, whether there is a tendency of a lane deviation of the host vehicle from a traveling lane. Camera controller 14 detects lane markers of the traveling lane from an image picture indicative of an area ahead of the host vehicle, which picture is taken by CCD camera 13. On the basis of the obtained lane makers ahead of the host vehicle, camera controller 14 defines a traveling lane and calculates a yaw angle $\phi$ of the host vehicle relative to the traveling lane, a lateral displacement X of the host vehicle relative to a center of the traveling lane, a curvature $\beta$ of the traveling lane, a width L of the traveling lane and the like.

When the detection of the lane markers is not clearly executed due to unclearness of the lane markers caused by wearing or a weather factor such as snowing, the parameters indicative of yaw angle $\phi$, lateral displacement X, curvature $\beta$, and width L are set at zero. Further, when the detection of the lane markers is turned from a detectable condition to an undetectable condition due to some obstacles for a short time, driving/braking force control unit 8 employs the previous data which is, in turn, stored in a storage section of driving/braking force control unit 8.

Furthermore, the host vehicle is equipped with an acceleration sensor 15 for detecting a longitudinal acceleration Xg and a lateral acceleration Yg of the host vehicle, a yaw rate sensor 16 for detecting a yaw rate $\phi'$ of the host vehicle, a master cylinder pressure sensor 17 for detecting a master cylinder pressure Pm indicative of an output pressure of master cylinder 3, an accelerator opening sensor 18 for detecting an accelerator opening Acc indicative of a depression degree of an accelerator pedal, a steer angle sensor 19 for detecting a steer angle $\delta$ of a steering wheel 21, wheel speed sensors 22FL, 22FR, 22RL and 22RR for respectively detecting wheels speeds $Vw_{FL}$, $Vw_{FL}$, $Vw_{FL}$ and $Vw_{FL}$ of wheels 5FL, 5FR, 5RL and 5RR, and a directional-signal switch 20 for detecting a turn-direction indicating operation of the driver through turn-signal lamps.

Driving/braking force control unit 8 receives detection signals of the above-discussed sensors 15 through 20 provided in the host vehicle. Further, driving/braking force control unit 8 receives signals indicative of yaw angle $\phi$, lateral displacement X, curvature $\beta$ and width L from camera controller 14, and driving torque Tw controlled by driving torque control unit 14.

When the traveling condition indicative data treated by driving/braking force control unit 8 includes a directionality of leftward or rightward, the data indicative of leftward is represented by a positive value. Accordingly, when the host vehicle turns left, yaw rate $\phi'$, lateral acceleration Yg, steer angle $\delta$ and yaw angle $\phi$ respectively take positive values. Further, when the host vehicle deviates from a center of the traveling lane to a leftward position, lateral displacement X takes a positive value. Further, driving/braking force control unit 8 outputs an alarm signal AL to alarm device 23 so as to generate alarm sound according to the determination of the control unit 8.

Subsequently, there will be discussed a lane-keep control process executed by driving/braking force control unit 8, with reference to a flowchart of FIGS. 2 and 3. This lane-keep control process is a timer interruption routine executed at 10 mill-seconds sampling-time intervals.

At step S1, control unit 8 reads data outputted from various sensors, various controllers and control units shown in FIG. 1. Specifically, the data includes longitudinal acceleration Xg, lateral acceleration Yg, yaw rate $\phi'$, each wheel speed $Vw_i$, accelerator opening Acc, master-cylinder pressure $P_m$, steer angle $\delta$, the turn-signal lamp switch signal, driving torque Tw outputted from driving torque control unit 12, yaw angle $\phi$, lateral displacement X, curvature $\beta$, and width L.

At step S2, control unit 8 calculates vehicle speed V of the host vehicle from an average of wheel speeds $Vw_{FL}$ and $Vw_{FR}$ of front-left and front-right wheels 5FL and 5FR which are of non-driving wheels ($V=(Vw_{FL}+Vw_{FR})/2$).

At step S3, control unit 8 calculates a deviation estimate XS corresponding to an estimated future lateral displacement. More specifically, by using yaw angle $\phi$, lateral displacement X, curvature $\beta$ and vehicle speed V, control unit 8 calculates deviation estimate XS from the following expression (1):

$$XS = Tt \times V \times (\phi + Tt \times V \times \beta) + X, \quad (1)$$

where Tt is a vehicle headway time for calculating a front remarking distance, and the front remarking distance is calculated by multiplying vehicle headway time Tt and vehicle speed V of the host vehicle. That is, when deviation estimate XS at a moment, which vehicle heat time Tt elapsed, is greater than or equal to a lateral-displacement limit value $X_C$, control unit 8 determines that there is a possibility that the host vehicle deviates the traveling lane or a tendency that the host vehicle is deviating from the center of the traveling lane.

Figure 4:
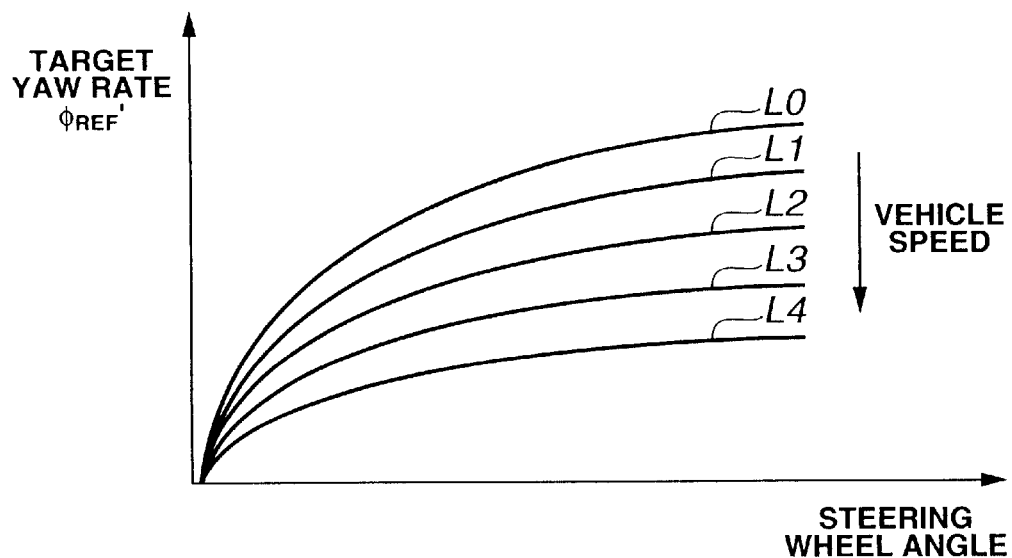
FIG. 4 is a control map employed in the information processing of FIG. 2.

At step S4, control unit 8 calculates a target yaw rate $\phi_{REF}'$ on the basis of steer angle δ detected by steer angle sensor 19 and vehicle speed V calculated at step S2 and with reference to a target yaw rate calculation map shown in FIG. 4. The target yaw rate calculation map represents a relationship between steer angle δ and target yaw rate $\phi_{REF}'$ using vehicle speed V as a parameter. Under a low-speed vehicle traveling condition, when steer angle δ is zero (δ=0), target yaw rate $\phi_{REF}'$ becomes zero ($\phi_{REF}'=0$). Accordingly, characteristic curves L0, L1, L2, L3 and L4 are set such that target yaw rate $\phi_{REF}'$ steeply increases according to the increase of steer angle δ during an initial condition and thereafter slowly increases. Further, characteristic curves L0 through L4 are further set such that target yaw rate $\phi_{REF}'$ decreases according as vehicle speed V increases. That is, according to the increase of vehicle speed V, selected characteristic curve is changed from L0 to L4, gradually.

At step S5, control unit 8 determines whether or not the host vehicle is put in a steeply turning condition where an absolute value $|Y_G|$ is greater than a lateral displacement set value $Y_{GS}$ and an absolute value $|\phi'|$ of yaw rate $\phi'$ is greater than target yaw rate $\phi_{REF}'$. That is, when $|Y_G|>Y_{GS}$ and $|\phi'|>\phi_{REF}'$, control unit 8 determines that the host vehicle is in the steep-turn condition. Therefore, control unit 8 determines that the host vehicle is put in an unstable condition. Accordingly when the determination at step S5 is affirmative, the routine proceeds to step S6 wherein a vehicle unstable flag $F_{CS}$ is set at 1 ($F_{CS}=1$). Then, the routine proceeds to step S8. When the determination at step S5 is negative, that is, when $|Y_G|\leq Y_{GS}$ or $|\phi'|\leq\phi_{REF}'$, control unit 8 determines that the host vehicle is put in a stable condition. Therefore, the routine proceeds to step S7 wherein vehicle unstable flag $F_{CS}$ is reset ($F_{CS}=0$). Then, the routine proceeds to step S8.

At step S8, control unit 8 determines whether or not turn-signal switch 20 is put in ON state. When the determination at step S8 is affirmative, that is, when turn-signal switch 20 is put in ON state, the routine proceeds to step S9 wherein control unit 8 determines whether or not a plus/minus sign of a turn-direction indicative signal WS of turn-signal switch 20 corresponds to a plus/minus sign of deviation estimate XS. When the determination at step S9 is affirmative, that is, when both of plus/minus signs of turn-direction indicative signal WS and deviation estimate XS are the same plus/minus sign (+ or −), control unit 8 determines that the lane change is executed according to the driver's intent, and the routine proceeds to step S10 wherein control unit 8 sets a lane change flag $F_{LC}$ at 1 ($F_{LC}=1$) which indicates there is the driver's intent. Thereafter, the routine proceeds to step S18. When the determination at step S9 is negative, that is, when control unit 8 determines that the lane change is not executed, the routine proceeds to step S11 wherein control unit 8 resets lane change flag $F_{LC}$ ($F_{LC}=0$).

On the other hand, when the determination at step S8 is negative, that is, when turn-signal switch 20 is put in OFF state, the routine proceeds to step S12 wherein control unit 8 determines whether or not the switch condition of turn-signal switch 20 is changed from ON condition to OFF condition. When the determination at step S12 is affirmative, control unit 8 determines that the lane change has just finished. Therefore, the routine proceeds to step S13.

At step S13 subsequent to the affirmative determination at step S12, control unit 8 determines whether or not a predetermined time period such as 4 seconds has elapsed from the affirmative determination at step S12. This step S13 is repeated until the affirmative determination is made. When the determination at step S13 becomes affirmative, the routine proceeds to step S14 wherein control unit 8 resets lane change flag $F_{LC}$ ($F_{LC}=0$) executing step S13. Thereafter, the routine proceeds to step S18.

When the determination at step S12 is negative, that is, when the switch condition of turn-signal switch 30 is not changed from ON condition to OFF condition, the routine proceeds to step S15 wherein control unit 8 determines whether steer angle δ is greater than or equal to a preset value $\delta_S$ and a steer angle deviation Δδ is greater than or equal to a preset value $\Delta\delta_S$. When the determination at step S15 is affirmative, that is, when $\delta\geq\delta_S$ and $\Delta\delta\geq\Delta\delta_S$, control unit 8 determines that the driver intends to execute a lane change. Therefore, the routine proceeds to step S16 wherein control unit 8 sets lane change flag $F_{LC}$ at 1 ($F_{LC}=1$). Thereafter, the routine proceeds to step S18. When the determination at step S15 is negative, that is, when $\Delta\delta<\delta_S$ or $\Delta\delta<\Delta\delta_S$, control unit 8 determines that the driver does not intend to execute the lane change. Therefore, the routine proceeds to step S16 wherein control unit 8 resets lane change flag $F_{LC}$ ($F_{LC}=0$). Thereafter, the routine proceeds to step S18.

At step S18, control unit 8 determines whether or not an absolute value |XS| of deviation estimate XS is greater than or equal to an alarm threshold $X_W$ which is obtained by subtracting a margin $X_M$ from a lateral displacement limit value $X_C$ ($X_W=X_C-X_M$), where the margin $X_M$ corresponds to a time lag from a starting moment of the alarm operation to a starting moment of the lane-keep control. When the determination at step S18 is affirmative ($|XS|\geq X_W$), control unit 8 determines that the host vehicle is put in a lane-deviation condition. Therefore, the routine proceeds to step S19 wherein control unit 8 outputs alarm signal AL to alarm device 23.

On the other hand, when the determination at step S18 is negative ($|XS|<X_W$), control unit 8 determines that the host vehicle is not put in the lane-deviation condition. Therefore, the routine proceeds to step S20 wherein control unit 8 determines whether the alarm operation is being executed or not. When the determination at step S20 is affirmative, the routine proceeds to step S21 wherein control unit 8 determines whether absolute value |XS| of deviation estimate XS is smaller than a value obtained by subtracting a hysteresis value $X_H$ from alarm threshold $X_W$, where hysteresis value $X_H$ is a value employed for preventing a hunting of the alarm operation. When the determination at step S21 is affirmative ($|XS|<X_W-X_H$), the routine proceeds to step S22 wherein control unit 8 stops outputting alarm signal AL to alarm device 23. When the determination at step S21 is negative ($|XS|\geq X_W-X_H$), control unit 8 determines that the alarm operation is continued, and therefore the routine proceeds to step S19.

At step S23 subsequent to the execution of step S19 or S22, control unit 8 determines whether or not deviation estimate XS is greater than or equal to lateral-displacement limit value $X_C$. In Japan this lateral-displacement limit value $X_C$ may be fixed at 0.8 m since a width of the traveling lane in a high-way has been determined as 3.35 m by law. When the determination at step S23 is affirmative ($XS\geq X_C$), control unit 8 determines that the host vehicle will deviate leftward from the traveling lane. Therefore, the routine proceeds to step S24 wherein control unit 8 sets lane deviation flag $F_{LD}$ at 1 ($F_{LD}$=1). When the determination at step 23 is negative (XS<$X_C$), the routine proceeds to step S25 wherein control unit 8 determines whether or not deviation estimate XS is smaller than or equal to a negative value -$X_C$ of lateral-displacement limit value $X_C$. When the determination at step S25 is affirmative (XS≦$X_C$), control unit 8 determines that the host vehicle will deviate rightward from the traveling lane. Therefore, the routine proceeds to step S26 wherein control unit 8 sets lane deviation flag $F_{LD}$ is set at -1 ($F_{LD}$=-1). When the determination at step 23 is negative (XS>-$X_C$), control unit 8 determines that the host vehicle will deviate rightward from the traveling lane. Therefore, the routine proceeds to step S27 wherein control unit 8 sets lane deviation flag $F_{LD}$ at 0 ($F_{LD}$=0).

At step S28 subsequent to the execution of step S24, S26 or S27, control unit 8 determines whether or not vehicle unstable flag $F_{CS}$ is set at 1. When the determination at step S28 is affirmative ($F_{CS}$=1), the routine proceeds to step S29 wherein control unit 8 resets load deviation flag $F_{LD}$ ($F_{LD}$=0). Thereafter, the routine proceeds to step S31. When the determination at step S28 is negative ($F_{CS}$≠0), the routine proceeds to step S30 wherein control unit 8 determines whether or not load change flag $F_{LC}$ is set at 1. When the determination at step S30 is affirmative ($F_{LC}$=1), the routine proceeds to step S29. When the determination at step S30 is negative ($F_{LC}$=0), the routine proceeds to step S31.

At step S31, control unit 8 determines whether or not lane deviation flag $F_{LD}$ is reset. When the determination at step S31 is affirmative ($F_{LD}$=0), the routine proceeds to step S32 wherein control unit 8 sets lane-keep control prohibition flag $F_{CA}$ is reset ($F_{CA}$=0). Then, the routine proceeds to step S35. When the determination at step S31 is negative ($F_{LD}$≠0), the routine proceeds to step S33 wherein control unit 8 determines whether or not an absolute value |XS(n-1)-XS(n)| is greater than or equal to a discontinuity threshold $L_{XS}$, wherein XS(n-1) is a previous deviation estimate, XS(n) is a present deviation estimate, and $L_{XS}$ is a threshold for determining as to whether deviation estimate XS is continuous or discontinuous. When the determination at step S33 is negative (|XS(n-1)-XS(n)|<$L_{XS}$), the routine proceeds to step S35. When the determination at step S33 is affirmative (|XS(n-1)-XS(n)|>$L_{XS}$), the routine proceeds to step S34 wherein control unit 8 sets lane-keep control prohibition flag FCA is set at 1 ($F_{CA}$=1). Thereafter, the routine proceeds to step S35.

Figure 5:
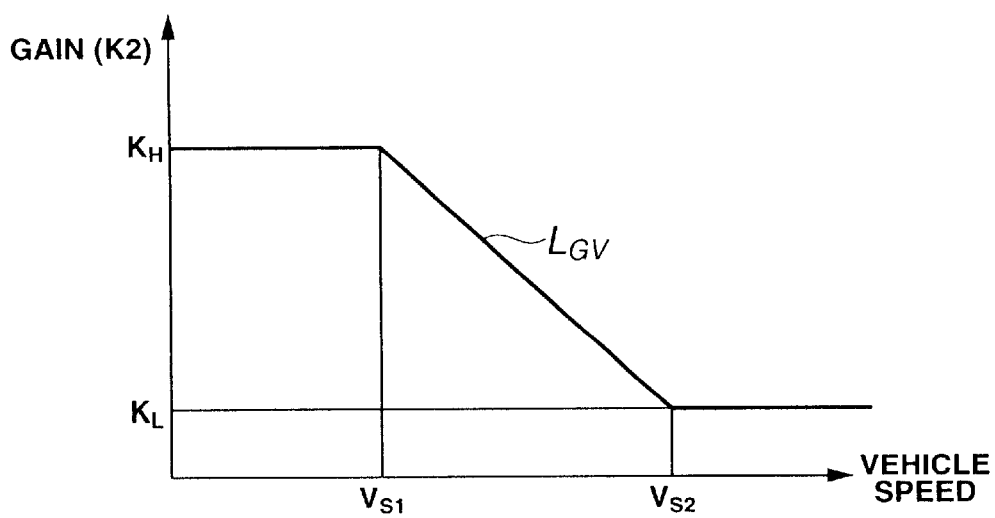
FIG. 5 is a control map employed in the information processing of FIG. 3.

At step S35, control unit determines whether lane deviation flag $F_{LD}$ is not zero and lane-keep control prohibition flag $F_{CA}$ is zero. When the determination at step S35 is affirmative, that is, when $F_{LD}$≠0 and $F_{CA}$=0, the routine proceeds to step S36 wherein control unit 8 calculates a target yawing moment Ms using the following expression (2):

$$M_S = -K1 \times K2 \times (XS-XC), \quad (2)$$

where K1 is a proportional coefficient determined from the specification of the vehicle, and K2 is a gain set according to vehicle speed V with reference to a gain map shown in FIG. 5. As is clearly shown in FIG. 5, a characteristic line $L_{GV}$ indicative of a relationship between gain K2 and vehicle speed V are set such that when vehicle speed V ranges from zero to a predetermined low value $V_{S1}$, gain K2 is fixed at a relatively large value $K_H$, that when vehicle speed V is within a range from $V_{S1}$ to a predetermined high value $V_{S2}$, gain K2 is decreased according to the increase of vehicle speed V, and that when vehicle speed V is higher than predetermined high value $V_{S2}$, gain K2 is fixed at a relatively small value $K_L$.

When the determination at step S35 is negative, that is, when $F_{LD}$=0 or $F_{CA}$=1, the routine proceeds to step S37 wherein control unit 8 sets target yawing moment MS at zero (MS=0). Thereafter, the routine proceeds to step S38.

At step S38, control unit 8 determines whether lane deviation flag $F_{LD}$ is set at 0 and lane-keep control prohibition flag $F_{CA}$ is set at 1. When the determination at step S38 is affirmative, that is, when $F_{LD}$=0 and $F_{CA}$=1, the routine proceeds to step S39 wherein control unit 8 sets a front-left-wheel target hydraulic pressure $Ps_{FL}$ and a front-right-wheel target hydraulic pressure $Ps_{FR}$ at a master cylinder pressure Pm as shown by the following expression (3). Further, control unit 8 sets a rear-left-wheel target hydraulic pressure $Ps_{RL}$ and a rear-right-wheel target hydraulic pressure $Ps_{RR}$ at a rear master cylinder pressure Pmr, which is calculated from master cylinder pressure Pm taking account of a distribution between front wheels and rear wheels. Thereafter, the routine proceeds to step S46.

$$Ps_{FL} = Ps_{FR} = Pm \quad (3)$$

$$Ps_{RL} = Ps_{RR} = Pmr \quad (4)$$

When the determination at step S38 is negative that is, when $F_{LD}$≠0 or $F_{CA}$=0, the routine proceeds to step S40 wherein control unit 8 determines whether or not an absolute value |$M_S$| of target yawing moment $M_S$ is smaller than a preset value $M_{S1}$. When the determination at step S40 is affirmative (|$M_S$|<$M_{S1}$) the routine proceeds to step S41 wherein control unit 8 sets target brake hydraulic pressure difference $\Delta Ps_F$ for the front wheels 5FL and 5FR at 0 using the following expression (5) and sets target brake hydraulic pressure difference $\Delta Ps_R$ for the rear wheels 5RL and 5RR at 2·$K_{BR}$·|Ms|/T using the following expression (5).

$$\Delta P_F = 0 \quad (5)$$

$$\Delta Ps_R = 2 \cdot K_{BR} \cdot |Ms|/T \quad (6)$$

Then, the routine proceeds to step S43.

On the other hand, when the determination at step S40 is negative (|Ms|≧Ms1), the routine proceeds to step S42 wherein control unit 8 sets target brake hydraulic pressure difference $\Delta Ps_F$ for the front wheels 5FL and 5FR at 2·$K_{BR}$·(|Ms|-Ms1)/T using the following expression (7) and sets target brake hydraulic pressure difference $\Delta Ps_R$ for the rear wheels 5RL and 5RR at 2·$K_{BR}$·Ms1/T using the following expression (8).

$$\Delta P_{SF} = 2 \cdot K_{BR} \cdot (|Ms| - Ms1)/T \quad (7)$$

$$\Delta P_{SR} = 2 \cdot K_{BR} \cdot Ms1/T \quad (8)$$

where T is a tread which is common in front wheels and rear wheels for the sake of simplicity, and $K_{BF}$ and $K_{BR}$ are conversion coefficients employed for converting the braking force into the brake hydraulic pressure and are determined from the specifications of the brake system. At step S42, control unit 8 may set target brake hydraulic pressure difference $\Delta Ps_F$ for the front wheels 5FL and 5FR at 2·$K_{BR}$·|Ms|/T and generates the braking force difference only at the front wheels.

At step S43, control unit 8 determines whether or not the host vehicle tends to deviate leftward by determining whether target yawing moment Ms takes a negative value or not. When the determination at step S43 is affirmative (Ms<0), the routine proceeds to step S44 wherein control unit 8 sets target brake pressure $Ps_{FL}$ for front-left wheel 5FL at Pm using the following expression (9), sets target brake pressure $Ps_{FR}$ for the front-right wheel 5FR at Pm+$\Delta Ps_F$ using the following expression (10), sets target brake pressure $Ps_{RL}$ for rear-left wheel 5RL at Pmr using the following expression (11), and sets target brake pressure $Ps_{RR}$ for the rear-right wheel 5RR at Pmr+$\Delta Ps_F$ using the following expression (12). Then, the routine proceeds to step S46.

$$Ps_{FL}=Pm \qquad (9)$$

$$Ps_{FR}=Pm+\Delta Ps_F \qquad (10)$$

$$Ps_{RL}=Pmr \qquad (11)$$

$$Ps_{RR}=Pmr+\Delta Ps_R \qquad (12)$$

On the other hand, when the determination at step S43 is negative (Ms≧0), the routine proceeds to step S45 wherein control unit 8 sets target brake pressure $Ps_{FL}$ for front-left wheel 5FL at Pm+$\Delta Ps_F$ using the following expression (13), sets target brake pressure $Ps_{FR}$ for the front-right wheel 5FR at Pm using the following expression (14), sets target brake pressure $Ps_{RL}$ for rear-left wheel 5RL at Pmr+$\Delta Ps_F$ using the following expression (15), and sets target brake pressure $Ps_{RR}$ for the rear-right wheel 5RR at Pmr using the following expression (16). Then, the routine proceeds to step S46.

$$Ps_{FL}=Pm+\Delta Ps_F \qquad (13)$$

$$Ps_{FR}=Pm \qquad (14)$$

$$Ps_{RL}=Pmr+\Delta Ps_R \qquad (15)$$

$$Ps_{RR}=Pmr \qquad (16)$$

At step S46, control unit 8 determines whether or not deviation determination flag $F_{LD}$ takes a value except for zero. When the determination at step S46 is affirmative ($F_{LD}\neq 0$), the routine proceeds to step S47 wherein control unit 8 calculates target driving torque Trq using the following expression (17). Thereafter, the routine proceeds to step S49.

$$Trq=f(Acc)-g(Ps) \qquad (17)$$

where Ps is a sum of target brake pressure differences generated by the lane-keep control (Ps=$Ps_F$+$Ps_R$), f(Acc) is a function for calculating target driving torque according to the accelerator opening, and g(Ps) is a function for calculating a predicted brake torque which will be generated by the brake hydraulic pressure.

When the determination at step S46 is negative ($F_{LD}$=0), the routine proceeds to step S48 wherein control unit 8 calculates target driving torque Trq using the following expression (18). Thereafter, the routine proceeds to step S49.

$$Trq=f(Acc) \qquad (18)$$

At step S49, control unit 8 outputs target brake pressures $Ps_{FL}$, $Ps_{FL}$, $Ps_{RL}$ and $Ps_{RR}$ to brake hydraulic pressure control circuit 7 and outputs target driving torque Trq to driving torque control unit 12. Then, the routine proceeds to a return step to terminate the present timer interruption routine and to return a main routine.

Figure 2:
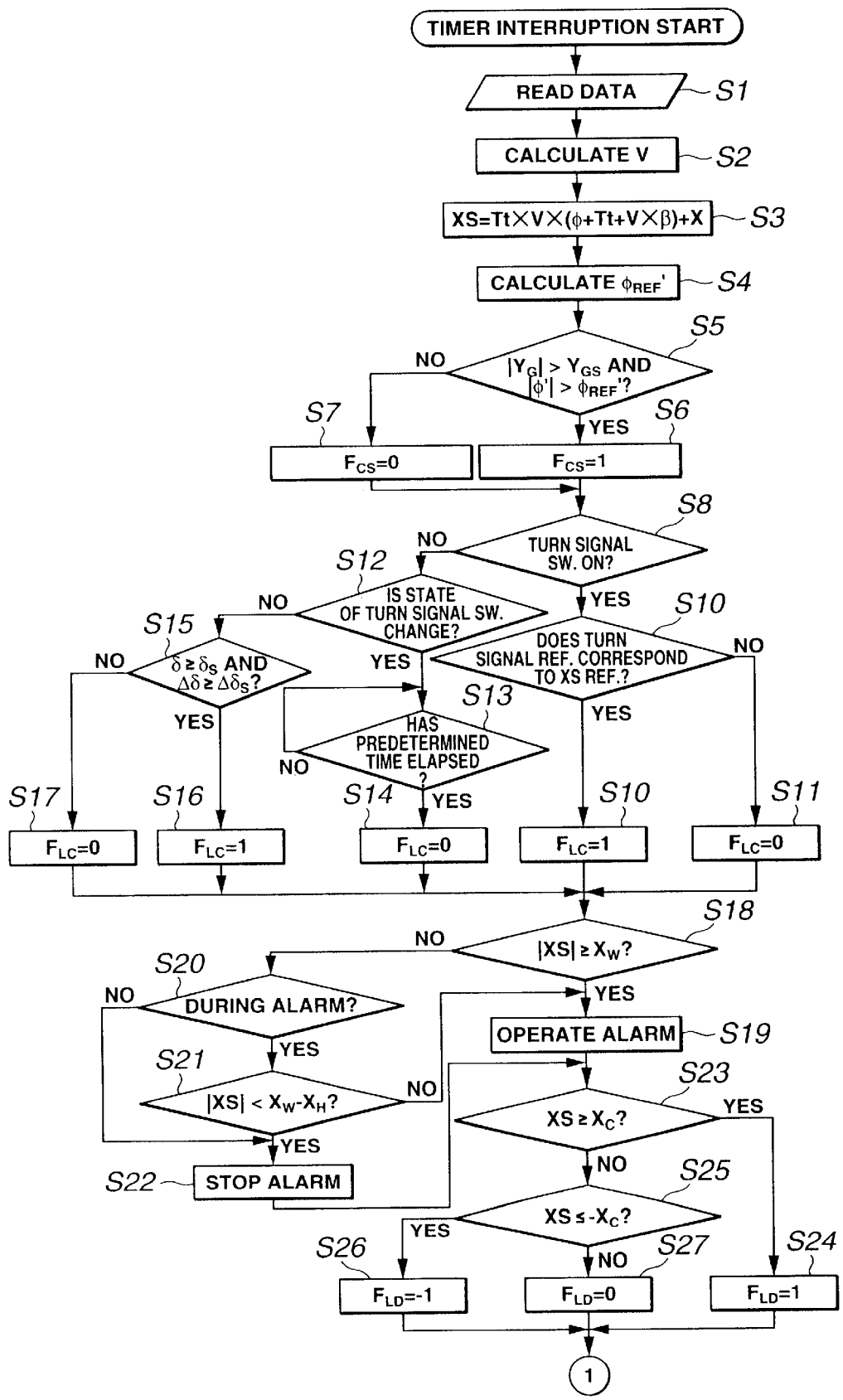
FIG. 2 is a flowchart showing a front part of an information processing executed by a driving/braking force control unit of FIG. 1.
Figure 3:
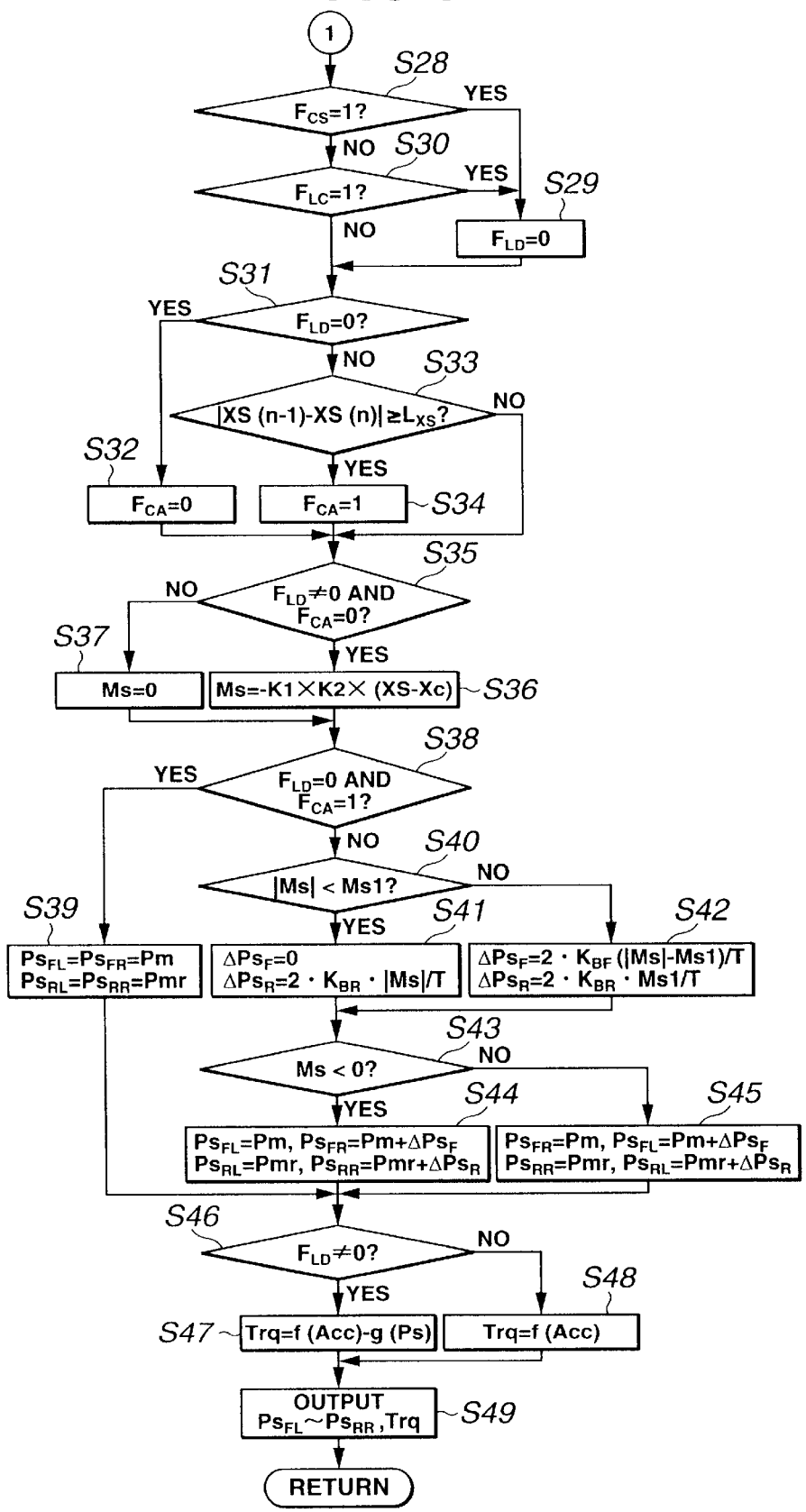
FIG. 3 is a flowchart showing a rear part of the information processing subsequent to the flowchart of FIG. 2.

In this lane-keep control process shown in FIGS. 2 and 3, the processing of steps S1 and S2, CCD camera 13, camera controller 14, acceleration sensor 14 and yaw rate sensor 16 correspond to travel condition detecting means. The processing of steps S4 through S30, S36, S39 through S49 and brake hydraulic pressure control unit 7 correspond to lane-keep control means. The processing of steps S36, S40 through S42 correspond to driving/braking force controlled variable calculating means. The processing of steps S43 through S49 corresponds to driving/braking force control means. The processing of steps S31 through S38 corresponds to control-start limiting means.

Figure 6:
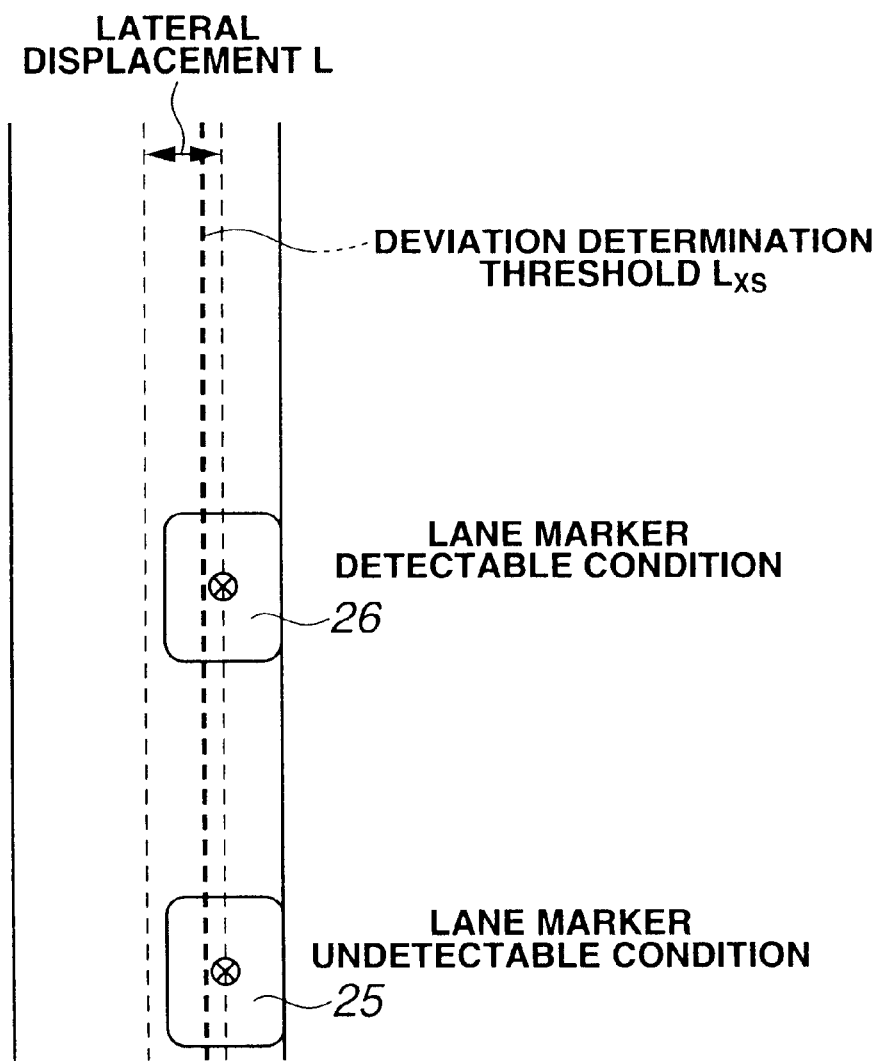
FIG. 6 is an explanatory view for an operation of the first embodiment according to the present invention.
Figure 7A:
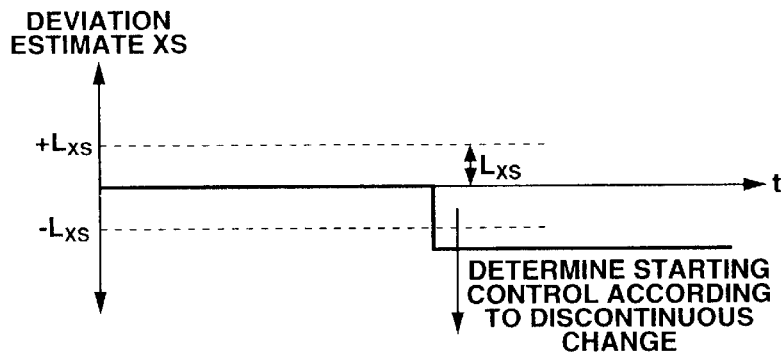
FIGS. 7A through 7D are time charts employed to explain the operation of the first embodiment.

With the thus arranged lane-keep control system according to the present invention, under a condition that the host vehicle travels straight ahead as shown in FIG. 6, when a condition that camera controller 14 cannot recognize the lane markers is continued for the reason that the lane markers are almost erased or hidden by weather factor such as snow, various detection parameters such as yaw angle φ, lateral displacement X, curvature β and travel-lane width L take zero. Therefore, deviation estimate XS calculated at step S3 takes zero (XS=0) in the processing of FIGS. 2 and 3, as shown in FIG. 7A.

Since the host vehicle travels straight according to the above parameters, lateral acceleration Yg and yaw rate φ' take zero. Accordingly, the routine in FIG. 3 proceeds from step S5 to step S7 wherein vehicle unstable flag $F_{CS}$ is reset ($F_{CS}$=0). Further, when the driver does not intend to execute the lane change, that is, when the turn signal switch 20 is put in OFF state, the routine proceeds from step S8 through steps S12 and S15 to step S17 wherein lane change flag $F_{LC}$ is resets ($F_{LC}$=0). Further, since deviation estimate XS takes zero (XS=0), the routine proceeds from step S18 through steps S20, S22, S23 and S25 to step S27 wherein deviation flag $F_{LD}$ is reset ($F_{LD}$=0).

Figure 7B:
Figure 7C:
Figure 7D:
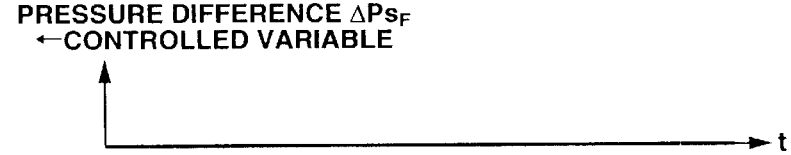

Accordingly, the routine proceeds through step S28, S30 to step S32 wherein lane-keep control prohibiting flag $F_{CS}$ is reset ($F_{CS}$=0) as shown in FIG. 7B. Further, the routine proceeds from step S35 to step S37 wherein target yawing moment Ms is set at zero (Ms=0) as shown in FIG. 7C.

Since $F_{LD}$=0 and $F_{CA}$=0, the affirmative determination is made at step S38, and the routine proceeds to step S40. Since target yawing moment Ms is zero, the routine proceeds to step S41 wherein both of front-wheel brake hydraulic pressure differences $\Delta Ps_F$ and rear-wheel brake pressure difference $\Delta Ps_R$ are set at zero ($\Delta Ps_F$=0 and $\Delta Ps_R$=0). Therefore, the routine proceeds through step S43 to step S45 wherein target brake pressures $Ps_{FL}$ and $Ps_{FR}$ of front wheels 5FL and 5FR are set at Pm and target brake pressures $Ps_{RL}$ and $Ps_{RR}$ of rear wheels 5RL and 5RR are set at Pmr.

Further, since lane deviation flag $F_{LD}$ is set at zero ($F_{LD}$=0), the routine proceeds from step S46 to step S48 wherein target driving torque Trq is calculated according to an accelerator opening using the function for calculating the target driving torque according to the accelerator opening.

Furthermore, at step S49, target brake pressure $Ps_{FL}$, $Ps_{FR}$, $Ps_{RL}$ and $Ps_{RR}$ are outputted to brake hydraulic pressure control circuit 7, and target driving torque Trq is outputted to driving torque control unit 12.

Although brake hydraulic pressure control circuit 7 supplies master cylinder pressure Pm to wheel cylinders 6FL and 6FR for front wheels and master cylinder pressure Pmr to wheel cylinders 6RL and 6RR for rear wheels, both master cylinder pressure Pm and Pmr take zero due to the non-braking condition of the host vehicle (Pm=0 and Pmr=0), and the non-braking condition is maintained.

Thus, when camera controller 13 cannot recognize lane markers, control unit 8 prohibits the lane-keep control regardless of whether the host vehicle travels within a traveling lane or travels on a lane-deviation area as shown by reference numeral 25 in FIG. 6.

Therefore, when the host vehicle is traveling the lane-deviation area as shown by reference numeral 26 in FIG. 6 and when the lane-marker recognizing state is changed from a marker unrecognizable state incapable of recognizing the lane markers by means of camera controller 14 to a marker recognizable state capable of recognizing the lane markers, camera controller 14 outputs lateral displacement −X which violates deviation determination threshold $L_{XS}$.

Accordingly, in the processing of FIGS. 2 and 3, deviation estimate XS calculated at step S3 becomes smaller than lateral displacement −X. At this moment, the host vehicle maintains a non-steep-turn condition, the condition of $F_{CA}=0$ is maintained, and the driver does not intend to execute the lane change. Therefore, a condition of $F_{LC}=0$ is maintained. However, since absolute value |XS| of deviation estimate XS violates alarm determination threshold $X_W$. Due to this condition, the routine proceeds from step S18 to step S19 wherein control unit 8 outputs alarm signal AR to alarm circuit 21 to generate alarm.

Subsequently, the routine proceeds to step S23 wherein the affirmative determination is made since deviation estimate XS is smaller than lateral displacement limit $-X_C$. The routine proceeds through S25 to step S26 wherein lane deviation flag $F_{LD}$ is set at −1 ($F_{LD}=-1$). Then, the routine proceeds through steps S28, S30 and S31 to step S33. Since previous deviation estimate XS(n−1) is zero (XS(n−1)=0) and present deviation estimate XS(n) is negative and violates deviation determination threshold $L_{XS}$, the routine proceeds to step S34 wherein lane-keep control prohibit flag $F_{CA}$ is set at 1 ($F_{CA}=1$) as shown in FIG. 7B.

Subsequently, at step S35, the negative determination is made since $F_{LD}=-1$ and $F_{CA}=1$. Accordingly, the routine proceeds to step S37 wherein target yawing moment Ms is maintained at zero (Ms=0) as shown in FIG. 7C. Further, since $F_{CA}=1$ and $F_{LD}=-1$, the routine proceeds from step S38 to step S40. Accordingly, as is similar to the maker unrecognizable state incapable of recognizing lane markers, both of front-wheel brake hydraulic pressure difference $\Delta Ps_F$ and rear-wheel brake hydraulic pressure difference $\Delta Ps_R$ are maintained at zero ($\Delta Ps_F=0$ and $\Delta Ps_R=0$). Target brake hydraulic pressures $Ps_{FL}$ and $Ps_{FR}$ of front wheels 5FL and 5FR are set at master cylinder Pm, and target brake hydraulic pressures $Ps_{RL}$ and $Ps_{RR}$ of rear wheels 5RL and 5RR are set at master cylinder Pmr.

As to target driving torque Trq, although the routine proceeds from step S46 to step S47 due to $F_{LD}=-1$, both of front-wheel brake hydraulic pressure $\Delta Ps_F$ and rear-wheel brake hydraulic pressure difference $\Delta Ps_R$ are maintained at zero. Therefore, target driving torque Trq is calculated using the function for calculating target driving torque according to the accelerator opening at step S48.

Accordingly, as is similar to the marker unrecognizable state incapable of recognizing the lane markers, the non-braking condition is maintained, and driving torque control unit 12 maintains the driving force control on the basis of the accelerator opening.

Therefore, when a lane-marker recognition state is changed from the marker unrecognizable state to the marker recognizable state in the lane-deviation state, the stopped condition of the lane-keep control is maintained. This prevents the lane-keep control from being started using a large controlled variable and therefore prevents the driver from impressing a strange feeling.

Figure 8A:
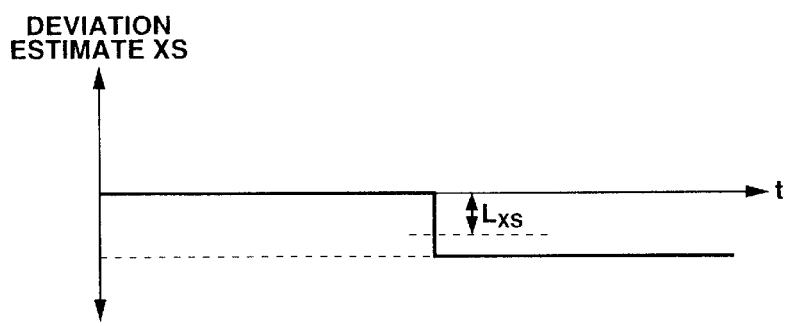
FIGS. 8A through 8C are time charts compared to the time charts of FIGS. 7A through 7D.
Figure 8B:
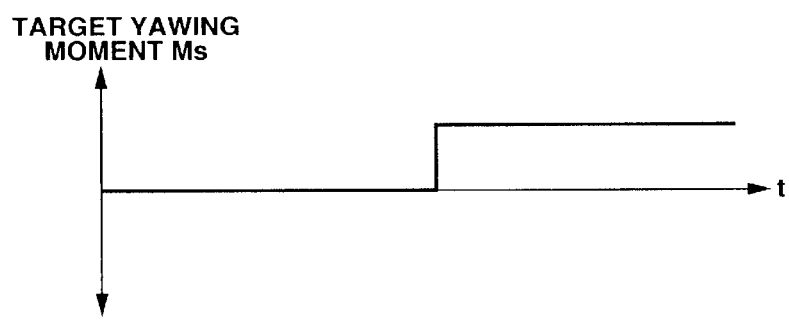
Figure 8C:
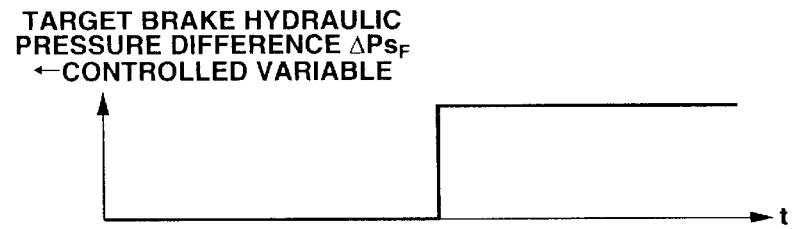
Figure 9:
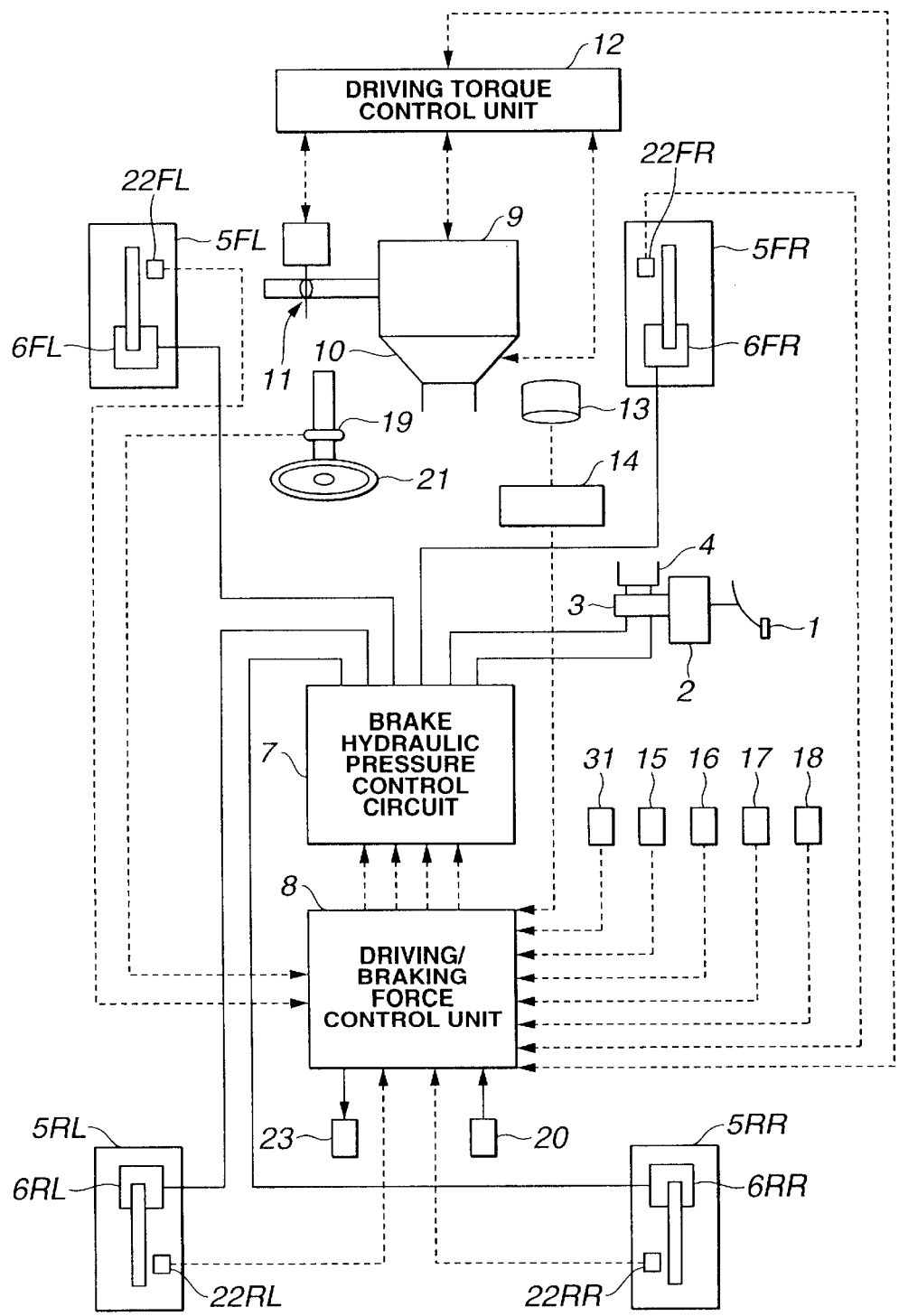
FIG. 9 is a schematic view showing the vehicle equipped with a lane-keep control system according to a second embodiment of the present invention.

In contrast to the present invention, in a case that lane-keep control prohibit flag $F_{CA}$ is not employed, when the lane marker recognition state is changed from the marker unrecognizable state to the marker recognizable state in the lane-deviation state and when deviation estimate XS violates deviation determination threshold $L_{XS}$ as shown in FIG. 8A, target yawing moment Ms is calculated on the basis of deviation estimate XS as shown in FIG. 8B, and target brake hydraulic pressure difference $\Delta Ps_F$ is calculated to take a large value as shown in FIG. 8C. Accordingly, in such a case not employing the inventive idea of the present invention, the lane-keep control is started using a large controlled variable, and therefore the driver has a strange feeling in the vehicle operation.

On the other hand, in this embodiment according to the present invention, lane-keep control prohibit flag $F_{CA}$ is maintained at 1 ($F_{CA}=1$) until deviation determination flag $F_{LD}$ is set at 0 ($F_{LD}=0$) by the cancellation of the lane-deviation condition of the host vehicle according to the driver's steering intervention. During $F_{CA}=1$, the prohibited condition of the lane-keep control is maintained. When the lane deviation condition is cancelled, deviation determination flag $F_{LC}$ is set at 0 ($F_{LC}=0$). Therefore, the routine proceeds from step S31 to step S32 wherein lane-keep control prohibit flag $F_{CA}$ is reset ($F_{CA}=0$). Further, the output of alarm signal AL is stopped at a moment when absolute value |XS| of deviation estimate XS becomes smaller than a value obtained by subtracting a hysteresis value $X_H$ from deviation determination threshold $X_W$, and therefore the alarm is stopped at this moment.

Accordingly, when the host vehicle next deviates from the traveling lane one of rightward and leftward, lane deviation flag $F_{LD}$ is set at 1, and therefore the routine proceeds from step S35 to step S36 wherein target yawing moment Ms is calculated on the basis of deviation estimate XS. When target yawing moment Ms is greater than or equal to a preset value Ms1, the routine proceeds from step S40 to step S41 wherein front-wheel brake hydraulic pressure difference $\Delta Ps_F$ and rear-wheel brake hydraulic pressure difference $\Delta Ps_R$ are calculated according to absolute value |Ms| of target yawing moment Ms. Subsequently, the routine proceeds to step S45 or S44 wherein target brake hydraulic pressures $Ps_{FL}$, $Ps_{FR}$, $Ps_{RL}$ and $Ps_{RR}$ for generating target yawing moment Ms are calculated. Thereafter, at step S47, target driving torque Trq is calculated by subtracting a driving torque generated by the control from a value of f(Acc) calculated according to the accelerator opening.

In response to the calculated target driving torque Trq, brake hydraulic pressures of wheel cylinders 6FL, 6FR, 6RL and 6RR and throttle opening of throttle valve 11 are controlled to execute the lane-keep control.

Further, when the host vehicle is put in a steep turn condition, vehicle unstable flag $F_{CS}$ is set at 1 ($F_{CS}=1$). When the driver intends to execute a lane change upon turning on turn signal lamp to leftward or rightward, lane change flag $F_{LC}$ is set at 1 ($F_{LC}=1$). Therefore, even when deviation determination flag $F_{LD}$ is set at 1 or −1 ($F_{LD}=0$) in these conditions, the routine proceeds to step S29 wherein deviation determination flag $F_{LD}$ is reset ($F_{LD}=0$). Accordingly, the routine proceeds from step S35 to step S37 wherein target yawing moment Ms is set at zero (Ms=0), and therefore the lane-keep control is prohibited.

When the driver intends to execute the lane change and even when the driver turns off the turn signal switch 20 during the lane-change operation, the routine proceeds from step S12 through step S13 to step S14 wherein lane change flag $F_{LC}$ is reset ($F_{LC}=0$) after the predetermined time period elapsed. This arrangement prevents the driver from having a strange feel generated by starting the lane-keep control during the lane change.

Next, referring to FIGS. 9 through 12, there is shown a second embodiment of the lane-keep control system according to the present invention.

The second embodiment is arranged such that when the lane-keep control is started in reply to turning on a control start switch 31, if the host vehicle is put in the lane deviation condition, the start of the lane-keep control is restricted. More specifically, as is clearly shown in FIG. 9, the lane-keep control system of the second embodiment further comprises control start switch 31 in addition to the construction of the first embodiment shown in FIG. 3. The parts corresponding to those in FIG. 1 are denoted by same reference numerals in FIG. 9, and the explanation thereof is omitted herein.

Figure 10:
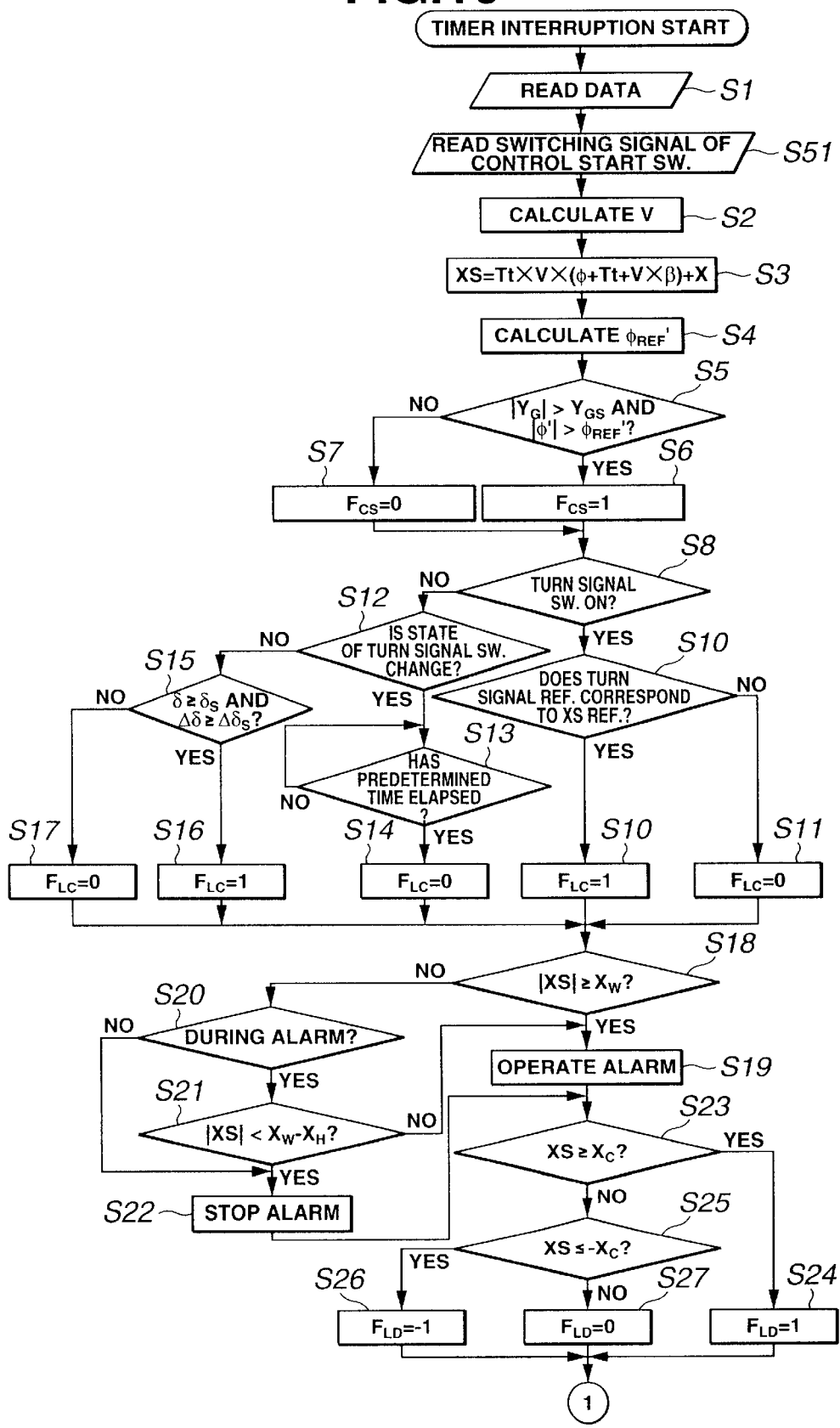
FIG. 10 is a flowchart showing a front part of an information processing executed by a driving/braking force control unit of FIG. 9.
Figure 11:
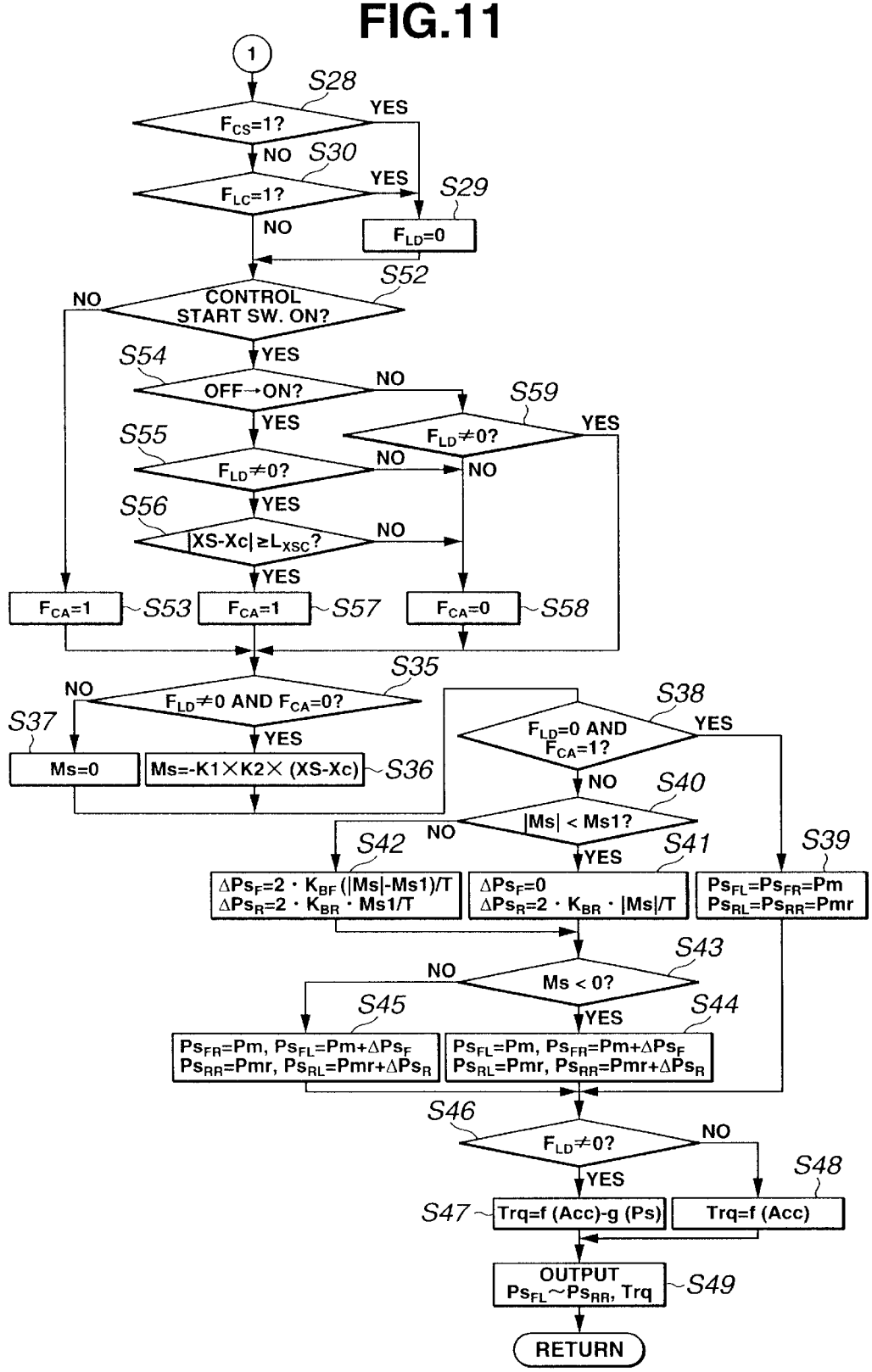
FIG. 11 is a flowchart showing a rear part of the information processing subsequent to the flowchart of FIG. 10.

Driving/braking force control unit 8 of the second embodiment executes the lane-keep control process shown in FIGS. 10 and 11.

As compared with the flowchart of FIG. 2, a flowchart of FIG. 10 further has a step S51 for reading a switching signal of control start switch 31 between steps S1 and S2. Further, as compared with the flowchart of FIG. 3, a flowchart of FIG. 11 omits steps S31 through S34 and newly has the following steps instead of steps.

That is, the routine in FIG. 11 proceeds from one of steps S29 and S30 to step S52 wherein control unit 8 determines whether or not control start switch 31 is put in ON state. When the determination at step S52 is negative, that is, when control start switch 31 is put in OFF state, the routine proceeds step S52 wherein lane-keep control prohibit flag $F_{CA}$ is set at 1 ($F_{CA}=1$). Thereafter, the routine proceeds to step S35.

When the determination at step S52 is affirmative, that is, when control start switch 31 is put in ON state, the routine proceeds to step S54 wherein control unit 8 determines whether or not a state of control start switch 31 is changed from OFF state to ON state. When the determination at step S54 is affirmative, that is, when the state of the control start switch 31 is just changed to ON state, the routine proceeds to step S55 wherein control unit 8 determines whether or not deviation determination flag $F_{LD}$ is not zero ($F_{LD}\neq 0?$). When the determination at step S55 is affirmative ($F_{LD}\neq 0$), the routine proceeds step S56 wherein control unit 8 determines whether or not an absolute value $|XS-Xc|$ of a value obtained by subtracting lateral displacement limit value Xc from deviation estimate XS is greater than or equal to a threshold $L_{XSC}$ for determining a control start limit. When the determination at step S56 is affirmative ($|XS-Xc|\geq 0$), the routine proceeds to step S57 wherein control unit 8 sets lane-keep control prohibit flag $F_{CA}$ at 1 ($F_{CA}=1$). Thereafter, the routine proceeds to step S35. When the determination at step S56 is negative ($|XS-Xc|<0$), the routine proceeds to step S58 wherein control unit 8 resets lane-keep control prohibit flag $F_{CA}$ ($F_{CA}=0$). Thereafter, the routine proceeds to step S35.

When the determination at step S55 is negative ($F_{LD}=0$), the routine proceeds to step S58. When the determination at step S54 is negative, that is, when the state of control start switch 31 is maintained in ON state, the routine proceeds to step S59 wherein control unit 8 determines whether or not deviation determination flag $F_{LD}$ is not set at zero ($F_{LD}\neq 0?$). When the determination at step S59 is affirmative ($F_{LD}\neq 0$), the routine proceeds to step S35. When the determination at step S59 is negative ($F_{LD}=0$), the routine proceeds to step S58.

In the processing shown in FIGS. 10 and 11, the processing at steps S1 and S2, CCD camera 12, camera controller 14, acceleration sensor 15 and yaw rate sensor 16 correspond to traveling condition detecting means. The processing at steps S4–S30, step S36, and steps S39–S49 and brake hydraulic pressure control circuit 7 correspond to lane-keep control means. The processing at step S36 and steps S40 through S42 correspond to driving/braking force control quantity calculating means. The processing at steps S43 through S49 corresponds to driving/braking force control means. The processing at steps S54 through S59 and steps S35 through S38 correspond to control-start limiting means.

With thus arranged second embodiment according to the present invention, when control start switch 31 is put in OFF state, by setting lane-keep control prohibit flag $F_{CA}$ at 1 ($F_{CA}=1$), the routine proceeds from step S35 to step S37 to set target yawing moment Ms at 0 (Ms=0) as is similar to the operation in the first embodiment, and therefore both of front-wheel brake hydraulic pressure difference $\Delta Ps_F$ and rear-wheel brake hydraulic pressure difference $\Delta Ps_R$ are set at 0 ($\Delta Ps_F=0$ and $\Delta Ps_R=0$). Further, both of target brake hydraulic pressures $Ps_{FL}$ and $Ps_{FR}$ of the respective front wheels 5FL and 5FR are set at master cylinder pressure Pm, and both of target brake hydraulic pressures $Ps_{RL}$ and $Ps_{RR}$ of the respective rear wheels 5RL and 5RR are set at rear-wheel master cylinder pressure Pmr. Furthermore, target drive torque Trq is set as a function based on the accelerator opening to stop the lane-keep control.

Figure 12:
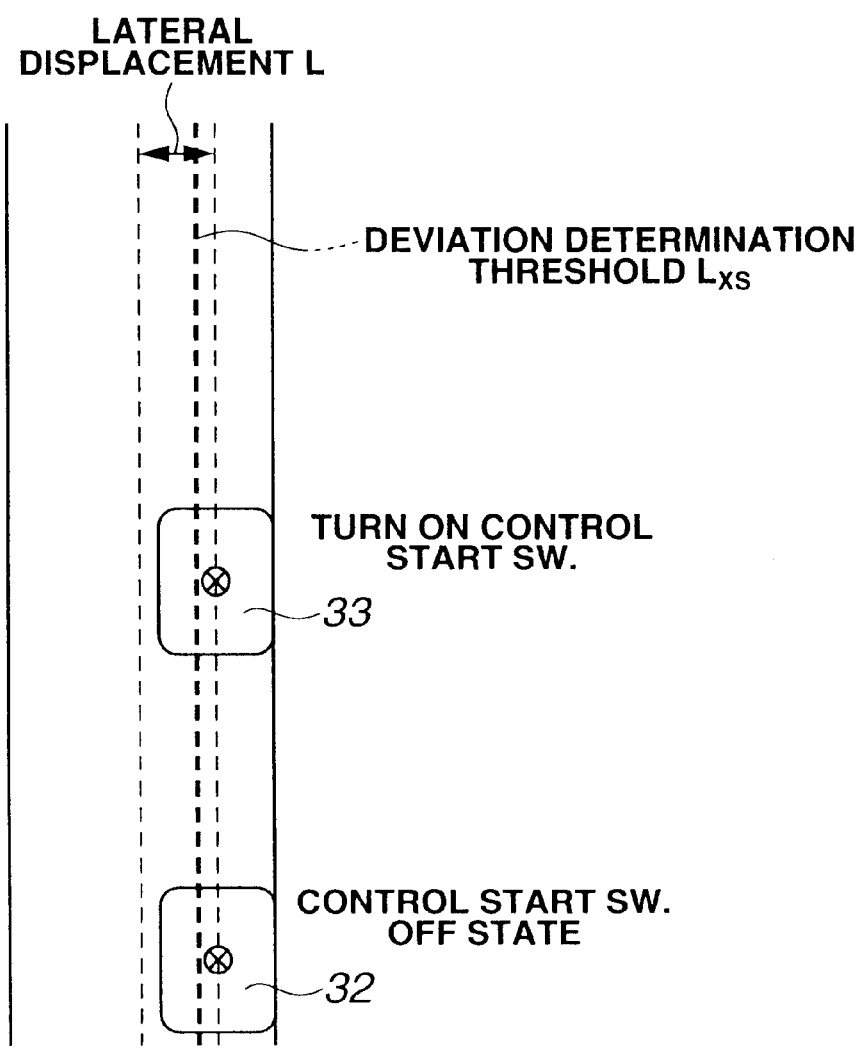
FIG. 12 is an explanatory view for an operation of the second embodiment according to the present invention.

Accordingly, under a stopped condition of the lane-keep control, when the host vehicle travels a rightward lane-deviation area where the lateral displacement –X is out of the deviation determination threshold $L_{XSC}$ as shown by a reference numeral 33 in FIG. 12 and when control start switch 31 is turned on as shown by a time chart of FIG. 13B, deviation estimate –XS calculated at step S3 in FIG. 10 maintains a value smaller than lateral displacement –X. Therefore, the routine proceeds from step S23 through step S25 to step S26 wherein deviation determination flag $F_{LD}$ is set at –1 ($F_{LD}=-1$). Since the state of control start switch 31 is changed from OFF state to ON state at this moment, the routine proceeds from step S52 through step S54 to step S55. Since deviation determination flag $F_{LD}$ is set at –1 ($F_{LD}=-1$), the routine proceeds from step S55 to step S56 wherein control unit 8 makes the affirmative determination ($|XS-Xc|\geq L_{XSC}$). Therefore, the routine proceeds to step S57 wherein lane-keep control prohibit flag $F_{CA}$ is set at 1 ($F_{CA}=1$) as shown in FIG. 13C. Further, the routine proceeds from step S35 to step S37 wherein target yawing moment Ms is set at 0 (Ms=0) as shown in FIG. 13D. Accordingly, target brake hydraulic pressure differences $\Delta Ps_F$ and $\Delta Ps_R$ are set at 0 as shown in FIG. 13E. This prevents the lane-keep control from being executed using the large con-trolled variable. Thereafter, under the lane-keep control prohibited condition, when deviation determination flag $F_{LD}$ is set at 0 ($F_{LD}=0$) due to a driver's steering intervention, the routine proceeds from step S59 to step S58 wherein lane-keep control prohibit flag $F_{CA}$ is reset ($F_{CA}=0$) to start the lane-keep control.

In contrast to this arrangement according to the present invention, if the lane-keep control system is not provided with lane-keep control prohibit flag $F_{CS}$, the lane-keep control starts at a moment when control start switch 31 is turned on. Therefore, target yawing moment Ms according to deviation estimate XS at this moment is calculated. Further, target brake hydraulic pressure differences $\Delta Ps_F$ and $\Delta Ps_R$ are calculated to take large values. Therefore, the driver has a strange feeling toward the lane keep control using a large controlled variable at the moment when control start switch 31 is turned on.

Figure 14:
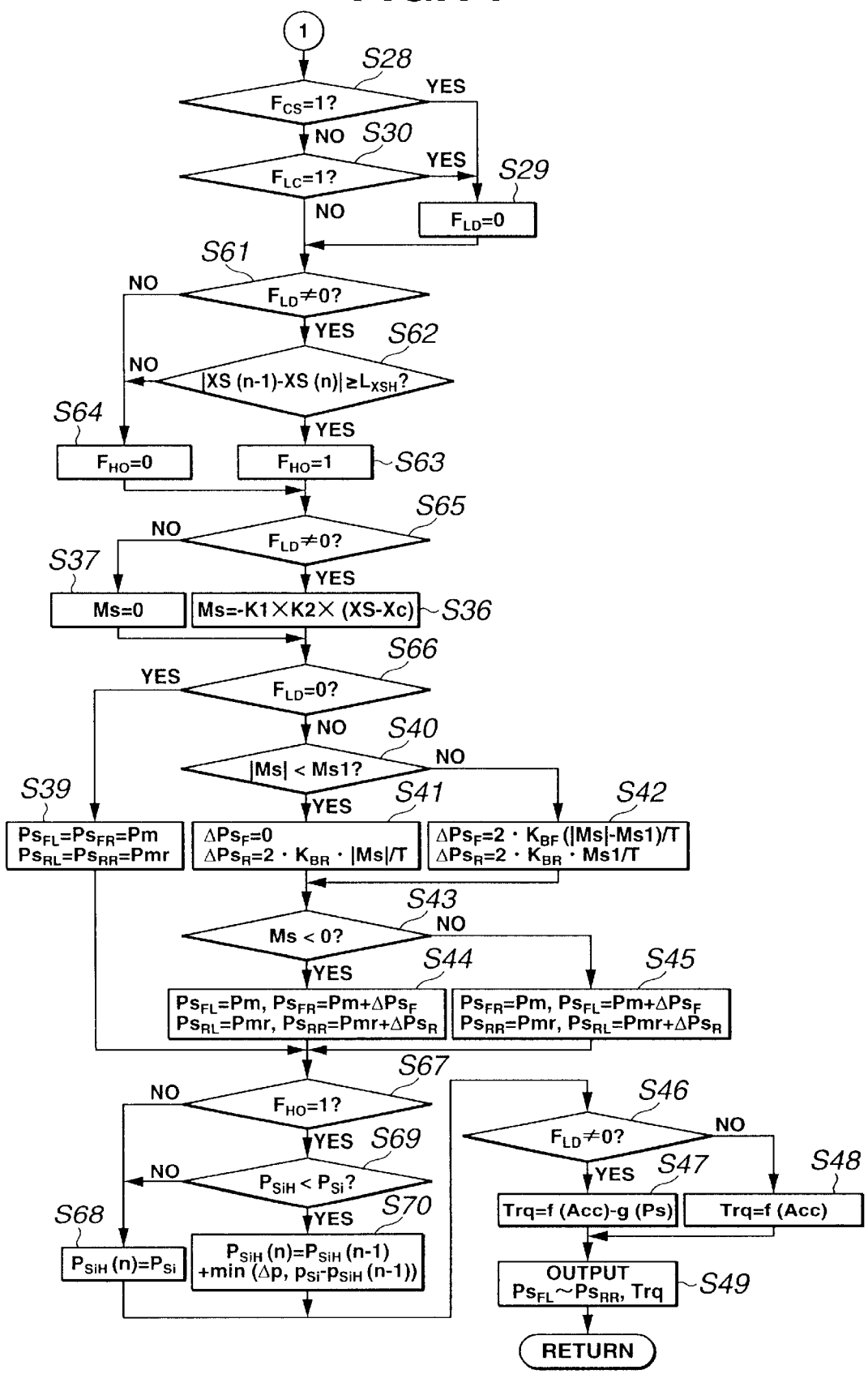
FIG. 14 is a flowchart showing a rear part of the information processing subsequent to the flowchart of FIG. 2 and executed by the driving/braking force control unit of a third embodiment according to the present invention.
Figure 15:
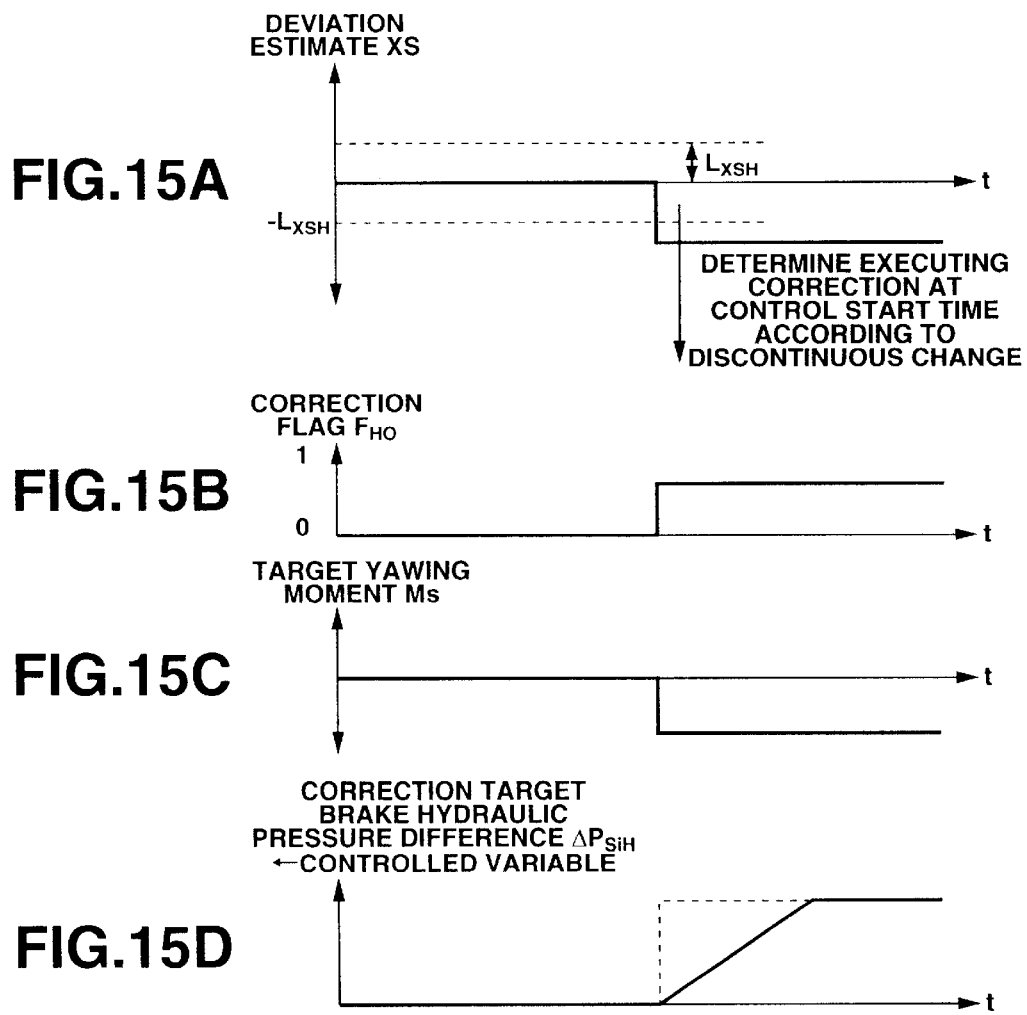
FIGS. 15A through 15D are time charts employed to explain the operation of the third embodiment.

Referring to FIGS. 14 and 15, a third embodiment according to the present invention will be discussed.

The third embodiment is arranged such that when deviation estimate XS is discontinuous, the lane keep control using a large controlled variable is limited by executing a correction for gradually increasing the target braking pressure. Further, the controlled variable is then gradually returned to a normal value.

As compared with the flowchart of FIG. 3, a flowchart of FIG. 14 in the third embodiment is provided with steps S61 through S65 and step S66 instead of steps S31 through S35 and step S38. Further, steps S67 through S70 are newly added above step S46. The other steps in FIG. 14 are the same as those in FIG. 3 and are denoted by same reference numerals. The explanation of the same steps is omitted herein.

Explaining the different steps, the routine proceeds from step S29 or S30 to step S61 wherein control unit 8 determines whether or not deviation flag $F_{LD}$ is set at 0 ($F_{LD}$=0?). When the determination at step S61 is negative ($F_{LD}\neq 0$), the routine proceeds to step S62 wherein control unit 8 determines whether or not an absolute value $|XS(n-1)-XS(n)|$ of a value obtained by subtracting the present deviation estimate XS(n) from the previous deviation estimate XS(n-1) is greater than or equal to a discontinuous determination threshold $L_{XSH}$. When the determination at step S62 is affirmative ($|XS(n-1)-XS(n)|\geq L_{XSH}$), that is, when control unit 8 determines that deviation estimate XS is discontinuous, the routine proceeds to step S63 wherein a correction flag $F_{HO}$ is set at 1 ($F_{HO}$=1). Thereafter, the routine proceeds to step S65 wherein control unit 8 determines whether or not deviation flag $F_{LD}$ is set at a value except for 1 ($F_{LD}\neq 0$?).

When the determination at step S62 is negative ($|XS(n-1)-XS(n)|<L_{XSH}$), that is, when control unit 8 determines that deviation estimate XS is continuous, the routine proceeds to step S64 wherein lane-keep control prohibit flag $F_{CA}$ is reset ($F_{CA}$=0) Thereafter, the routine proceeds to step S65.

When the determination at step S61 is affirmative ($F_{LD}$=0), control unit 8 determines that the host vehicle is put in a lane keep condition. Therefore, the routine proceeds to step S64.

Step S66 provided instead of step S38 also determines whether or not deviation flag $F_{LD}$ is set at 0 ($F_{LD}$=0?).

Furthermore, at step S67 subsequent to the execution of one of steps S44 and S45, control unit determines whether or not correction flag $F_{HO}$ is set at 1. When the determination at step S67 is negative ($F_{HO}$=0), the routine proceeds to step S68 wherein target brake pressures $Ps_{FL}$, $Ps_{FR}$, $Ps_{RL}$ and $Ps_{RR}$ ($Ps_i$: i=FL, FR, RL and RR) are respectively set as corrected target brake pressures $Ps_{FLH}(n)$, $Ps_{FRH}(n)$, $Ps_{RLH}(n)$ and $Ps_{RRH}(n)$ ($Ps_{iH}(n)$: i=FL, FR, RL and RR). When the determination at step S67 is affirmative ($F_{HO}$=1), the routine proceeds to step S69 wherein control unit 8 determines whether or not the present corrected target brake pressures $Ps_{FLH}$, $Ps_{FRH}$, $Ps_{RLH}$ and $Ps_{RRH}$ are respectively smaller than the target brake pressure target brake pressures $Ps_{FL}$, $Ps_{FR}$, $Ps_{RL}$ and $Ps_{RR}$ calculated at step S44 or S45. When the determination at step S69 is negative ($Ps_{iH}\geq Ps_i$), the routine proceeds to step S68. When the determination at step S69 is affirmative ($Ps_{iH}<Ps_i$), the routine proceeds to step S70 wherein control unit 8 calculates present corrected target brake pressures $Ps_{iH}$ using the following expression (19).

$$Ps_{iH}(n)=Ps_{iH}(n-1)+\min(\Delta p, Ps_i-Ps_{iH}(n-1)) \quad (19)$$

where previous value $Ps_{iH}(n-1)$ is set at 0 at an initial condition.

In the processing of FIG. 14, steps S61 through S70 and steps S36 and S37 correspond to control start correcting means.

With the thus arranged third embodiment, when a situation of the host vehicle is changed from a condition that the host vehicle travels the rightward lane deviation area under the marker recognizable state to a condition that the host vehicle travels the rightward lane deviation area under the marker recognizable state, as is similar to the case in FIG. 6, if deviation estimate XS calculated at step S3 in FIG. 2 is discontinuously increased stepwise in the negative direction as shown in FIG. 15A, the routine proceeds from step S25 to step S26 wherein deviation determination flag $F_{LD}$ is set at −1 ($F_{LD}$=−1). Accordingly, the routine in FIG. 14 proceeds from step S61 to step S62 wherein control unit 8 determines that $|XS(n-1)-XS(n)|\geq L_{XSH}$, and therefore the routine proceeds to step S63 wherein correction flag $F_{HO}$ is set at 1 ($F_{HO}$=1). Since deviation determination flag $F_{LD}$ has been set at −1 ($F_{LD}$=−1), the routine proceeds from step S65 to step S36 wherein control unit 8 sets target yawing moment Ms at a relatively large value according to the deviation estimate XS, as shown in FIG. 15C. Thereafter, the routine proceeds from step S40 to step S42 wherein control unit 8 calculates front-wheel brake hydraulic pressure difference $\Delta Ps_F$ and rear-wheel brake hydraulic pressure difference $\Delta Ps_R$ according to target yawing moment Ms, and therefore control unit 8 outputs target brake pressures $Ps_{FL}$, $Ps_{FR}$, $Ps_{RL}$ and $Ps_{RR}$ according to front-wheel brake hydraulic pressure difference $\Delta Ps_F$ and rear-wheel brake hydraulic pressure difference $\Delta Ps_R$.

Since correction flag $F_{HO}$ is set at 1, the routine proceeds from step S67 to step S69 wherein control unit 8 makes the affirmative determination ($Ps_{iH}<Ps_i$). Therefore, the routine proceeds to step S70 wherein control unit 8 increments corrected target brake pressure $Ps_{iH}$ by correction quantity $\Delta p$. Therefore, the brake hydraulic pressure supplied to each wheel cylinder 6i is gradually increased from 0 as shown in FIG. 15D and is brought closer to target brake pressure $Ps_i$ at a moment that corrected target brake pressure $Ps_{iH}$ reaches target brake pressure $Ps_i$.

Accordingly, in the case that the host vehicle is put in a lane deviation state when the lane marker detection state is changed from the marker undetectable state to the marker detectable state, the lane-keep control gradually starts. This arrangement firmly prevents the driver from having a strange feeling toward this lane-keep control. Further, corrected target brake pressure $Ps_{iH}$ increases according to the elapsed time and finally reaches a normal lane-keep control condition. This also ensures the advantages of the lane-keep control.

Although the third embodiment has been shown and described such that brake hydraulic pressure difference $\Delta Ps_{iH}$ of target brake hydraulic pressure $Ps_i$ is limited so as to gradually execute the lane-keep control when deviation estimate XS becomes discontinuous, the invention is not limited to this and may be arranged to execute the low-pass filter processing with respect to target brake hydraulic pressure $Ps_i$ so as to apply a first-order lag function thereto.

Further although the third embodiment has been shown and described so as to correct target brake hydraulic pressure $Ps_i$, the invention is not limited to this and may be arranged to execute a correction operation for limiting variations with respect to front-wheel brake hydraulic pressure difference $\Delta Ps_F$ and rear-wheel brake hydraulic pressure difference $\Delta Ps_R$.

Figure 16:
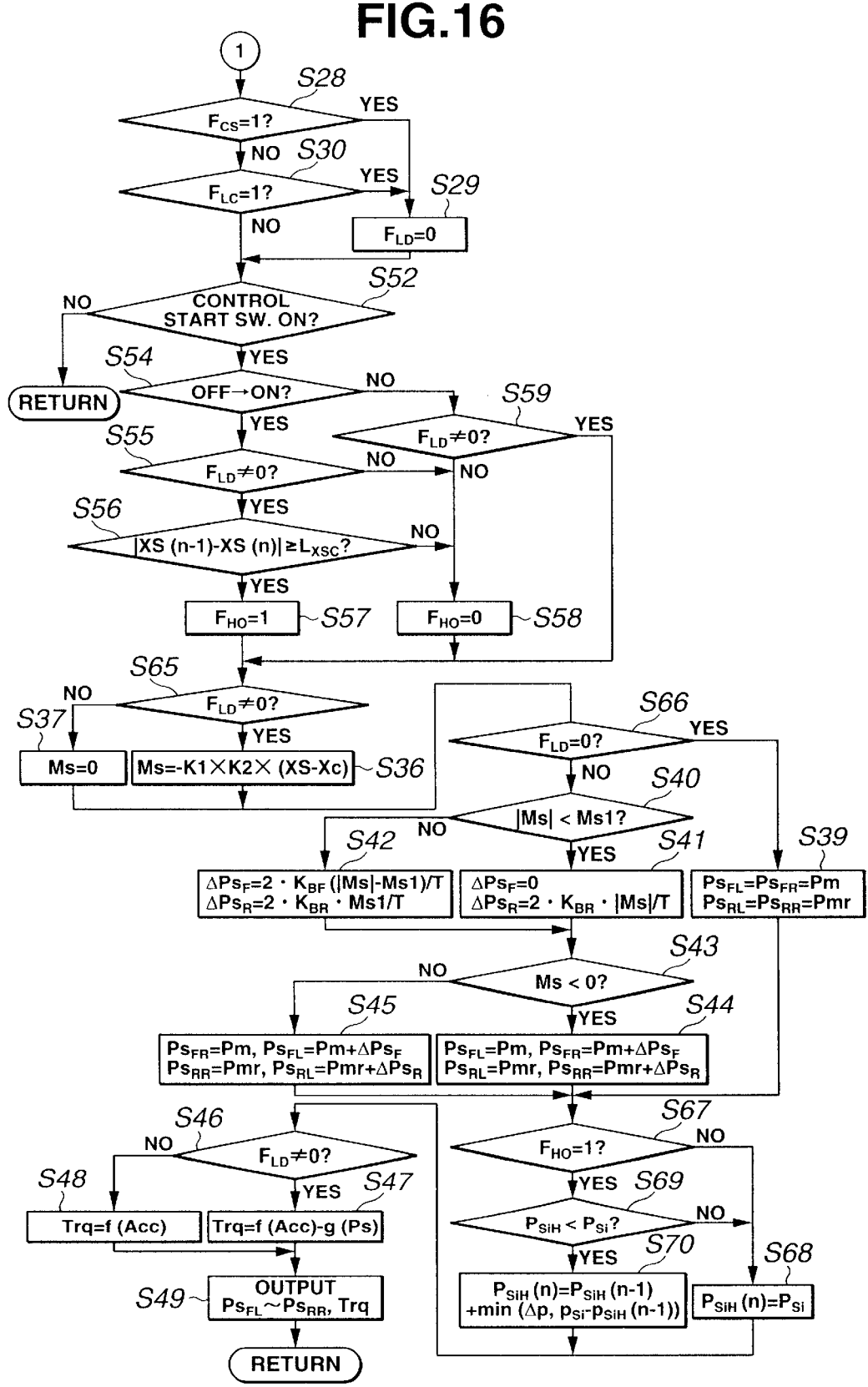
FIG. 16 is a flowchart showing a rear part of the information processing subsequent to the flowchart of FIG. 2 and executed by the driving/braking force control unit of a third embodiment according to the present invention.

Referring to FIGS. 16 and 17, a fourth embodiment of the present invention will be discussed.

The fourth embodiment is arranged such that the lane-keep control is gradually started when control start switch 31 is turned on under the lane deviation condition. More specifically, as compared with the flowchart of FIG. 11, a flowchart of FIG. 16 of the fourth embodiment is constructed such that step S53 is omitted, and the timer interruption routine is terminated when the determination at step is negative. Further, step S72 for setting correction flag $F_{HO}$ at 1 is provided instead of step S57 of FIG. 11. Step S73 for setting correction flag $F_{HO}$ at 0 is provided instead of step S58 of FIG. 11. Furthermore, steps S67 through S70 are provided between one of steps S44 and S45 and step S46, and Steps S65 and S66 are provided instead of steps S35 and S38, as are similar to the arrangements of the third embodiment.

The other steps are as same as those in FIG. 11 and are denoted by same reference numerals. The explanation thereof is omitted herein.

In the processing of FIG. 16, step S52 through S58, steps S65, S36, S37 and S66 corresponds to a control start correcting means.

Figure 17A:
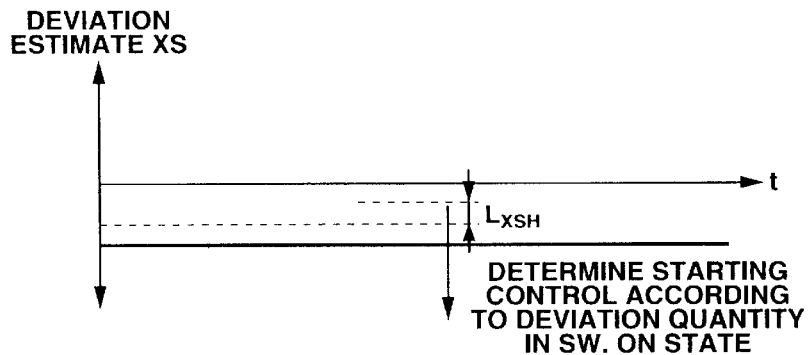
FIGS. 17A through 17E are time charts employed to explain the operation of the fourth embodiment.
Figure 17B:
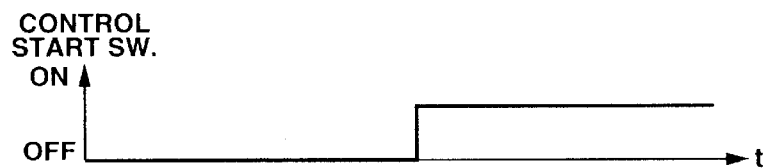
Figure 17C:
Figure 17D:

With this fourth embodiment according to the present invention, when the host vehicle travels the rightward lane-deviation area under a turned-off condition of control start switch 31, deviation estimate $-XS$ is set at a value smaller than deviation determination threshold $L_{XSH}$ as shown in FIG. 17A. However, the routine proceeds from step S52 to the return block, and this timer interruption processing is terminated. Accordingly, the lane-keep control is put in OFF state. By turning on control start switch 31 from this condition as shown by FIG. 17B, the routine proceeds from step S52 through steps S54, S55 and S56 to step S72 wherein correction flag $F_{HO}$ is set at 1 ($F_{HO}$=1). Therefore, as is similar to the third embodiment, target yawing moment Ms is set at a large value based on deviation estimate XS as shown in FIG. 17D. Front-wheel brake hydraulic pressure difference $\Delta Ps_F$ and rear-wheel brake hydraulic pressure difference $\Delta Ps_R$ are calculated according to the target yawing moment Ms, and target brake hydraulic pressure $Ps_i$ (i=FL, FR, RL and RR) is calculated.

Figure 17E:
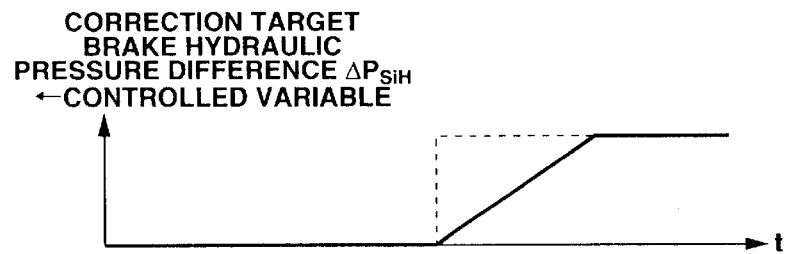

At this moment, correction flag $F_{HO}$ has been set at 1 ($F_{HO}$=1). Therefore, corrected target brake hydraulic pressure $Ps_{iH}$ is set at a small value obtained by adding correction value $\Delta p$ to 0 as shown in FIG. 17E and is supplied to each wheel cylinder 6i (i=FL, FR, RL and RR). Accordingly, the braking force is limited at first, and corrected target brake hydraulic pressure $Ps_{iH}$ is gradually increased according to the elapsed time. At last when corrected target brake hydraulic pressure $Ps_{iH}$ reaches target brake hydraulic pressure $Ps_i$, it is brought into target brake hydraulic pressure $Ps_i$.

Accordingly, when the host vehicle is traveling the lane deviation area and when the state of control start switch 31 is changed from OFF state to ON state, the lane-keep control is gradually started. This arrangement limits the execution of the lane-keep control using a large controlled variable. Further, this performs the lane-keep control by gradually transiting to the normal lane-keep control.

Subsequently, referring to FIGS. 18 and 19, a fifth embodiment according to the present invention will be discussed. The fifth embodiment is arranged such that the lane-keep control is executed by the steering control of a steering system instead of the brake pressure control.

Figure 18:
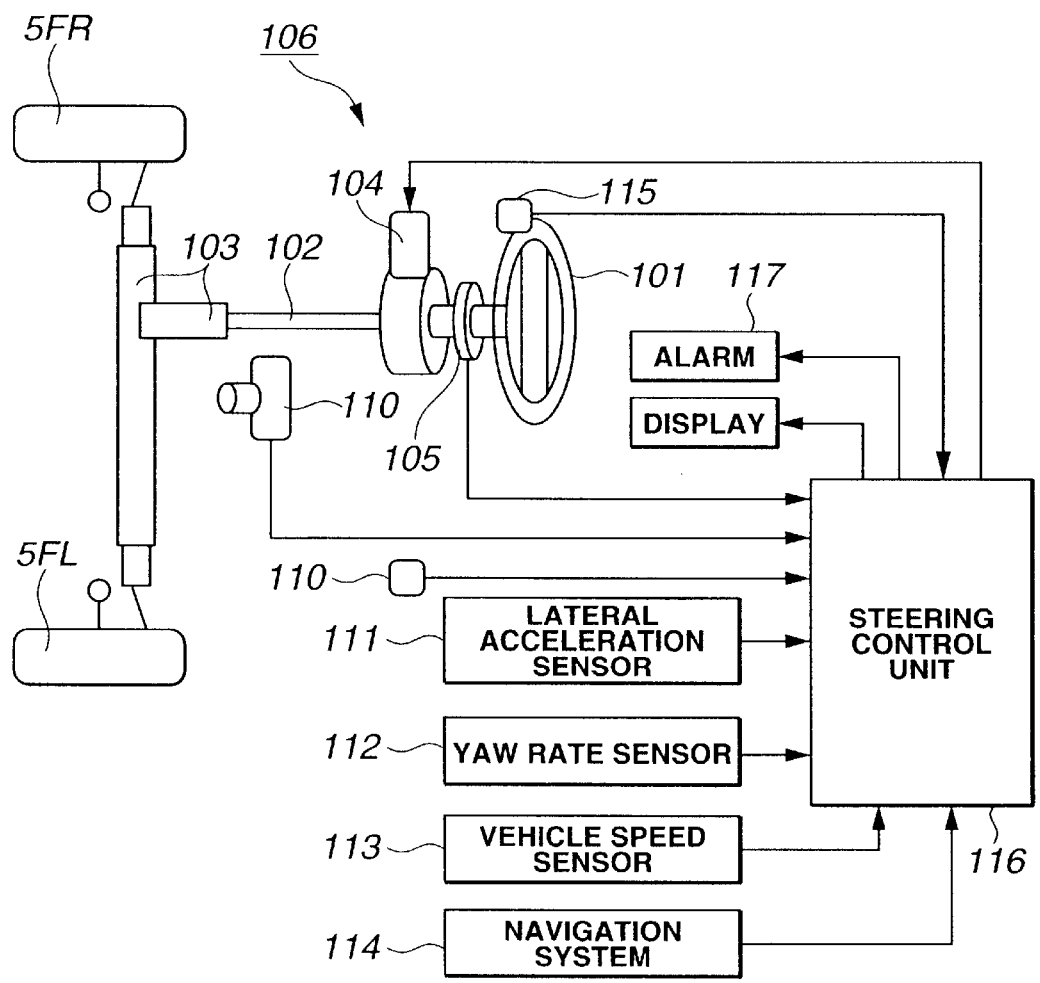
FIG. 18 is a schematic view showing a vehicle equipped with a lane-keep control system according to a fifth embodiment of the present invention.

More specifically, as shown in FIG. 18, the control system comprises a steering system 106 which has a steering wheel 101, a steering shaft 102, steering gear set 103, a steering actuator 104 and a steer angle sensor 105. Steering wheel 101 is interconnected with front-left wheel 5FL and front-right wheel 5FR through steering shaft 102 and steering gear set 103. Steering actuator 104 for generating a steering assist force is attached to steering shaft 102. Steer angle sensor 105 installed in steering system 101 to detect a steer angle of the host vehicle. Steering actuator 104 is controlled by a steering control unit 116 to which detection signals of a camera device 110 for taking an image view ahead of the host vehicle, a lateral acceleration sensor 111, a yaw rate sensor 112, and a vehicle speed sensor 113. Further, an alarm device 117 is connected to steering control unit 116.

Figure 19:
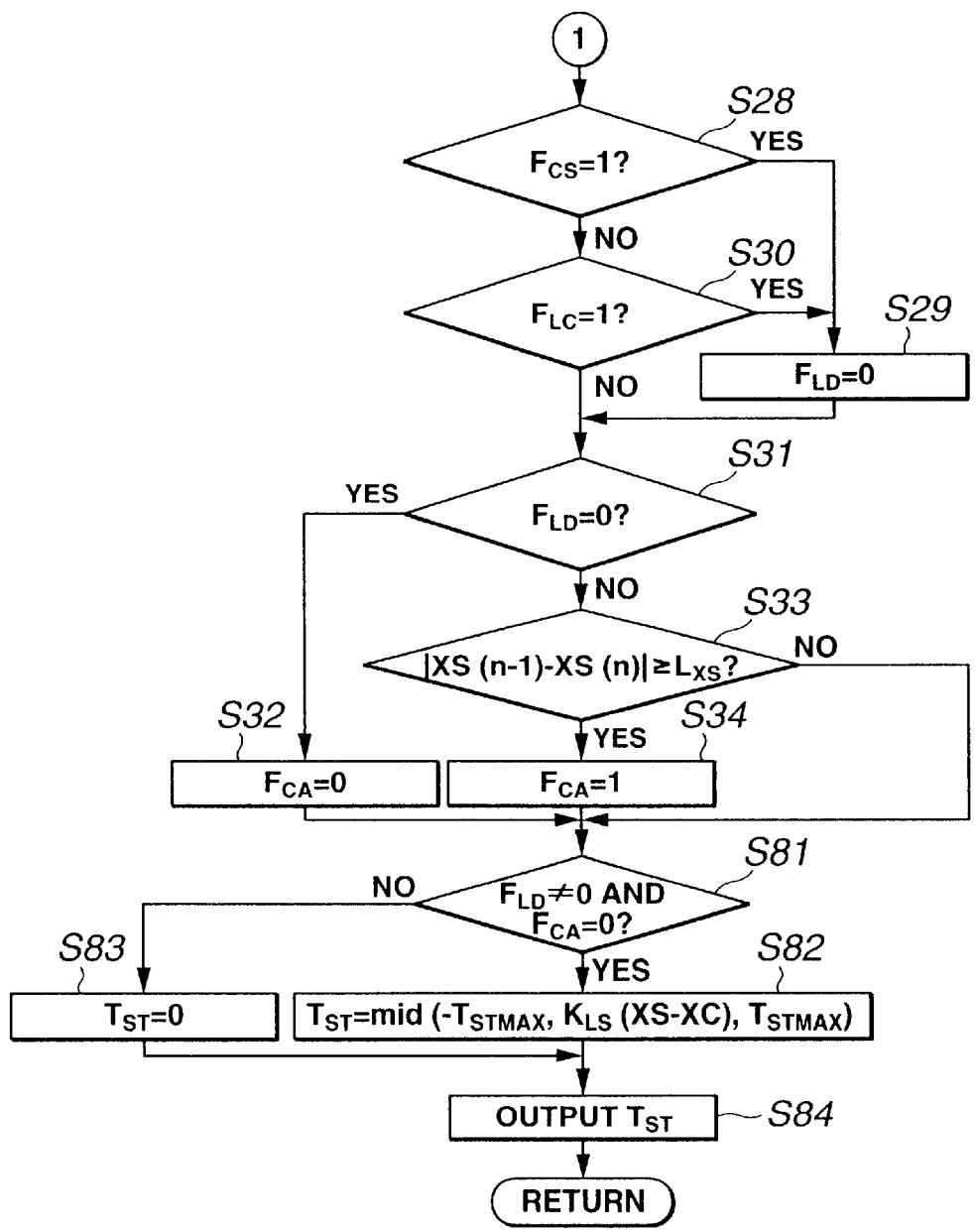
FIG. 19 is a flowchart showing a rear part of the information processing subsequent to the flowchart of FIG. 2 and executed by the driving/braking force control unit of a third embodiment according to the present invention. executed in the fifth embodiment.

Steering control unit 116 executes the lane-keep control processing shown in FIG. 19 so as to execute the lane-keep control by controlling steering system 106 when the host vehicle is put in the lane-deviation condition.

As shown in FIG. 19, the lane-keep control processing of the fifth embodiment according to the present invention is arranged to omit the processing of steps S36 through S49, to replace step S35 with step S81 wherein steering control unit 116 determines whether or not deviation determination flag $F_{LD}$ is not set at zero ($F_{LD}\neq 0$?) and lane-keep control prohibit flag $F_{CA}$ is set at 0 ($F_{CA}$=0?). When the determination at step S81 is affirmative ($F_{LD}\neq 0$ and $F_{CA}$=0), the routine proceeds to step S82 wherein steering control unit 116 calculates target additional steering torque $T_{ST}$ using the following expression (20). Thereafter, the routine proceeds to step S84.

$$T_{ST}=\mathrm{mid}(-T_{STMAX}, -K_{LS}(XS-Xc), T_{STMAX}) \tag{20}$$

where $T_{STMAX}$, is a limit value of the additional steering torque, $K_{LS}$ is a constant determined from vehicle specifications, and mid( ) is a function for selecting an intermediate value from values surrounded by brackets.

When the determination at step S81 is negative ($F_{LD}$=0 or $F_{CA}$=1), the routine proceeds to step S83 wherein steering control unit 116 sets target additional torque $T_{ST}$ at 0 ($T_{ST}$=0). Thereafter, the routine proceeds to step S84.

At step S84, steering control unit 116 outputs a drive signal according to target additional steering torque TST to control steering actuator 104 of steering system 106, and the present timer interruption routine is terminated to return the main routine.

In the processing shown in FIG. 19, the processing of steps S28 through S30, the processing of steps S81 through S84 and steering system 106 correspond to lane-keep control means. The processing of steps S31 through S34 corresponds to control start limiting means.

With the thus arranged fifth embodiment, in the case that the host vehicle travels the lane deviation area under the lane-marker undetectable condition of camera device 110 as is similar to the case in the first embodiment, when deviation estimate XS becomes discontinuous due to the change of the lane-marker detecting condition from the undetectable condition to the detectable condition, deviation determination flag $F_{LD}$ is set at a value except for zero ($F_{LD}\neq 0$). However, since lane-keep control prohibit flag $F_{CA}$ has been set at 1 ($F_{CA}$=1), the routine proceeds from step S81 to step S83, target additional steering torque $T_{ST}$ is set at 0 ($T_{ST}$=0). Therefore, steering control unit 116 output the drive signal to steering actuator of steering system 106 so as not to generate the additional steering torque. This means steering control unit 116 prohibits the lane-keep control under the above-discussed situation.

When deviation determination flag $F_{LD}$ is set at 0 as a result that the host vehicle is returned from a lane-keep control prohibit condition to the area within the lane markers by the driver's steering intervention and therefore deviation estimate XS becomes a small value, the lane-keep control prohibit flag $F_{CA}$ is reset at 0, and therefore the routine proceeds from step S81 to step S82 wherein additional steering torque $T_{ST}$ is calculated according to deviation estimate XS. Therefore, steering actuator 104 of steering system 106 executes the steering control by generating additional steering torque $T_{ST}$ according to the calculated additional torque $T_{ST}$ to return the host vehicle within the traveling lane between the lane markers.

Although the fifth embodiment according to the present invention has been shown and described such that the lane-keep control is executed under the situation corresponding to that discussed in the first embodiment, the lane-keep control of the fifth embodiment may be executed in the situation corresponding to those of the first through fourth embodiments.

Further, although the first through fifth embodiments have been shown and described such that the stability condition of the host vehicle is determined by determining whether or not the absolute value $|Y_G|$ of lateral acceleration $Y_G$ is greater than set value $Y_{GS}$ and absolute value $|\phi'|$ of yaw rate $\phi'$ is greater than target yaw rate $\phi_{REF}'$, the invention is not limited to this, and may be arranged such that the stability of the host vehicle is determined only by determining whether the absolute value $|Y_G|$ of lateral acceleration $Y_G$ is greater than set value $Y_{GS}$.

Furthermore, although the first through fourth embodiments have been shown and described such that lateral displacement limit value Xc is set at a constant value, it will be understood that the invention is not limited to this, and the lateral displacement limit value Xc may be varied according to the road condition which is obtained by calculating lane-width L through processing an image detected by CCD camera 13 or by reading information as to a lane width from the information of map data and a present position of the host vehicle obtained from a navigation system. In such a case, lateral displacement limit value Xc is calculated from the following expression (21).

$$Xc = \min(L/2 - L_C/2, 0.8) \qquad (21)$$

where $L_C$ is a width of the host vehicle equipped with the lane-keep control system, and min( ) is a function for selecting a smaller one of values surrounding by brackets.

Further, when a road infrastructure will be built in the future and when it becomes possible to obtain a lane width by means of a telecommunication between the host vehicle and the road infrastructure, such information may be employed. Further, when a distance L/2−XS to a lane marker at a deviation side is obtained from the infrastructure such as signal marker embedded in the traveling road, such information may be employed to obtain lateral displacement limit value Xc.

This application is based on Japanese Patent Applications No. 2001-355304 filed on Nov. 20, 2001 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A lane-keep control system for a host vehicle, comprising:
   a control unit configured,
   to detect a traveling condition of the host vehicle,
   to determine whether there is a tendency of a lane deviation indicative that the host vehicle is deviating from a traveling lane, according to the traveling condition,
   to execute a lane-keep control for controlling the host vehicle toward a deviation-preventing direction of preventing the lane deviation according to the traveling condition when there is the tendency of the lane deviation,
   to limit the lane-keep control when the lane-keep control is executed according to the determination as to the tendency of the lane deviation and when the determination as to the tendency of the lane deviation is made according to the traveling condition under a condition that the host vehicle is traveling a lane-deviation area deviated from the traveling lane.

2. The lane-keep control system as claimed in claim 1, wherein to limit the lane-keep control includes to limit a start of the lane-keep control.

3. The lane-keep control system as claimed in claim 1, wherein to limit the lane-keep control includes to correct a controlled variable of the lane-keep control at a start of the lane-keep control.

4. The lane-keep control system as claimed in claim 1, further comprising a control start switch for manually starting the lane-keep control, wherein the control unit is configured to limit a start of the lane-keep control when the control start switch is turned on, when the lane-keep control is executed according to the determination as to the tendency of the lane deviation, and when the determination as to the tendency of the lane deviation is made according to the traveling condition under the condition that the host vehicle is traveling the lane-deviation area.

5. The lane-keep control system as claimed in claim 1, further comprising a control start switch for manually starting the lane-keep control, wherein the control unit is configured to correct a controlled variable of the lane-keep control at a start of the lane-keep control when the control start switch is turned on, when the lane-keep control is executed according to the determination as to the tendency of the lane deviation and when the determination as to the tendency of the lane deviation is made according to the traveling condition under the condition that the host vehicle deviates from the traveling lane.

6. The lane-keep control system as claimed in claim 1, further comprising a control start switch for manually starting the lane-keep control, wherein the control unit is configured to prohibit a start of the lane-keep control when the control start switch is turned on under a condition that the host vehicle deviates from the traveling lane.

7. The lane-keep control system as claimed in claim 1, further comprising a control start switch for manually starting the lane-keep control, wherein the control unit is configured to prohibit a start of the lane-keep control when the control start switch is turned on under a condition that the host vehicle deviates from the traveling lane and when a deviation quantity of the host vehicle relative to the traveling lane is greater than or equal to a predetermined quantity.

8. The lane-keep control system as claimed in claim 1, wherein the control unit is configured to determine the lane deviation of the host vehicle on the basis of a lateral displacement of the host vehicle relative to the traveling lane, to start the lane-keep control when the host vehicle deviates from the traveling lane and when the lateral displacement is continuously varied, and to limit starting the lane-keep control when a deviation state of the host vehicle is discontinuously changed from a lane-keep state to a deviated state.

9. The lane-keep control system as claimed in claim 8, wherein the control unit is configured to determine that the lateral displacement is continuously varied on the basis of a history of the lateral displacement.

10. The lane-keep control system as claimed in claim 5, wherein the control unit is configured to decrease the controlled variable of the lane-keep control when the control start switch is turned on under a condition that the control unit determines that the host vehicle deviates from the traveling lane, to increase the decreased controlled variable to a predetermined value according to elapsed time.

11. The lane-keep control system as claimed in claim 1, wherein the control unit is configured to determine the deviation condition of the host vehicle on the basis of a lateral displacement of the host vehicle with respect to a center of the traveling lane, to start the lane-keep control when the host vehicle deviates from the traveling lane as a result that the lateral displacement is continuously varied, to decrease the controlled variable of the lane-keep control when a deviation state of the host vehicle is discontinuously changed from a lane-keep state to a deviated state, and to increase the decreased controlled variable to a predetermined value according to elapsed time.

12. The lane-keep control system as claimed in claim 1, wherein the control unit is configured to estimate an estimated lateral displacement indicative of a future lateral displacement of the host vehicle on the basis of at least a vehicle speed of the host vehicle, a yaw angle of the host vehicle relative to the traveling lane, a lateral displacement of the host vehicle relative to the traveling lane, and a curvature of a road ahead of the host vehicle, to estimate a deviating direction of the host vehicle and the tendency of the lane deviation from the estimated lateral displacement, and to determine that the host vehicle is in a deviated state when the estimated lateral displacement is greater than or equal to a limit lateral displacement.

13. The lane-keep control system as claimed in claim 1, wherein the control unit is configured to execute the lane-keep control by calculating driving/braking controlled variables for left and right wheels so as to generate a yawing moment of the host vehicle directed to a direction of preventing the lane deviation according to the vehicle traveling condition and by controlling a distribution of a driving/braking force to the left and right wheels according to the respective driving/braking controlled variables.

14. The lane-keep control system as claimed in claim 1, wherein the control unit is configured to estimate an estimated lateral displacement indicative of a future lateral displacement of the host vehicle relative to the traveling lane on the basis of at least a vehicle speed of the host vehicle, a yaw angle of the host vehicle relative to the traveling lane, a lateral displacement of the host vehicle relative to the traveling lane, and a curvature of a road ahead of the host vehicle, to calculate a target yawing moment to be generated by the host vehicle according to a difference between the estimated lateral displacement and a limit lateral displacement, and to control a driving/braking force to be generated at each wheel according to the target yawing moment.

15. The lane-keep control system as claimed in claim 13, wherein the control unit is configured to command a brake hydraulic pressure control circuit to generate a braking force of each wheel regardless a driver's braking intervention.

16. The lane-keep control system as claimed in claim 1, wherein the control unit is configured to output a steering command for generating a steering torque directed toward a direction of preventing the lane deviation to a steering system.

17. A method of executing a lane-keep control for controlling a host vehicle toward a deviation-preventing direction of preventing a lane deviation, the method comprising:

detecting a traveling condition of the host vehicle;

determining whether there is a tendency of the lane deviation that the host vehicle is deviating from a traveling lane according to the traveling condition;

executing the lane-keep control according to the traveling condition when there is the tendency of the lane deviation; and limiting the lane-keep control when the lane-keep control is executed according to the determination as to the tendency of the lane deviation and when the determination as to the tendency of the lane deviation is made according to the traveling condition under a condition that the host vehicle is traveling a lane-deviation area deviated from the traveling lane.

18. A lane-keep control system for a host vehicle, comprising:

traveling-condition detecting means for detecting a traveling condition of the host vehicle;

lane-deviation determining means for determining whether there is a tendency of a lane deviation that the host vehicle is deviating from a traveling lane according to the traveling condition;

lane-keep control means for executing a lane-keep control of controlling the host vehicle toward a deviation-preventing direction of preventing the lane deviation according to the traveling condition when there is the tendency of the lane deviation; and control limiting means for limiting the lane-keep control when the lane-keep control is executed according to the determination as to the tendency of the lane deviation and when the determination as to the tendency of the lane deviation is made according to the traveling condition under a condition that the host vehicle is traveling a lane-deviation area deviated from the traveling lane.

* * * * *